US012574344B2

(12) United States Patent
Park

(10) Patent No.: US 12,574,344 B2
(45) Date of Patent: Mar. 10, 2026

(54) SYSTEM FOR PROVIDING MESSAGE TRANSMISSION AND RECEPTION SERVICE USING MESSAGE STANDBY STATION

(71) Applicant: Joon Ho Park, Seoul (KR)

(72) Inventor: Joon Ho Park, Seoul (KR)

( * ) Notice: Subject to any disclaimer, the term of this patent is extended or adjusted under 35 U.S.C. 154(b) by 0 days.

(21) Appl. No.: 18/776,602

(22) Filed: Jul. 18, 2024

(65) Prior Publication Data

US 2025/0080484 A1     Mar. 6, 2025

(51) Int. Cl.
*H04L 51/214*     (2022.01)
*H04L 51/52*     (2022.01)
*G06Q 30/0207*     (2023.01)

(52) U.S. Cl.
CPC ............ *H04L 51/214* (2022.05); *H04L 51/52* (2022.05); *G06Q 30/0239* (2013.01)

(58) Field of Classification Search
CPC .... H04L 51/214; H04L 51/52; G06Q 30/0239
See application file for complete search history.

(56) References Cited

U.S. PATENT DOCUMENTS 8,229,819 B2 *   7/2012   Ransom ............. G06Q 30/0224
                                               705/14.1
9,767,467 B2 *   9/2017   Gebb ................. G06Q 30/0234

11,057,328 B2 *   7/2021   Liao ........................ H04L 43/20
2010/0125490 A1 *   5/2010   Kiciman ............ G06Q 30/0207
                                               705/14.1
2015/0220995 A1 *   8/2015   Guyot ................ G06Q 30/0269
                                               705/14.66

(Continued)

FOREIGN PATENT DOCUMENTS

KR     10-2000-0054221 A     9/2000
KR     10-2006-0070284 A     6/2006

(Continued)

OTHER PUBLICATIONS

Korean Request for the Submission of an Opinion of No. 10-2023-0116256 dated Oct. 4, 2023.

(Continued)

*Primary Examiner* — G. C. Neurauter, Jr.
(74) *Attorney, Agent, or Firm* — Sughrue Mion, PLLC

(57)     ABSTRACT
Provided is a system for providing a message transmission and reception service using a message standby station, including a transmitting terminal configured to upload message content and transmit the message content to a message standby station for message transmission to an unspecified multitude, a receiving terminal configured to competitively receive a message queued in the message standby station, and a transmission and reception service providing server including a receiving unit, a standby station management unit configured to, in response to a recipient being set as an unspecified multitude by the transmitting terminal, queue the message content in the message standby station, a processing unit configured to, in response to the message queued in the message standby station, record processing of the reception in a log, and a statistics management unit configured to store statistical data on the message content of which the reception has been processed.

9 Claims, 23 Drawing Sheets

(56)     References Cited

U.S. PATENT DOCUMENTS

| | | | |
|---|---|---|---|
| 2016/0255082 A1* | 9/2016 | Rathod | G06Q 50/01 |
| | | | 726/1 |
| 2016/0371271 A1* | 12/2016 | Bhatia | G06F 16/9535 |
| 2017/0041277 A1* | 2/2017 | Langen | H04L 51/52 |
| 2018/0018707 A1* | 1/2018 | Berry, Jr. | G06Q 30/0257 |
| 2018/0225693 A1* | 8/2018 | Postrel | G06F 16/9535 |
| 2023/0214875 A1* | 7/2023 | Catalano | H04L 51/214 |
| | | | 705/14.39 |

FOREIGN PATENT DOCUMENTS

| | | | |
|---|---|---|---|
| KR | 10-2009-0105799 A | | 10/2009 |
| KR | 10-2013-0020508 A | | 2/2013 |
| KR | 10-2014-0022573 A | | 2/2014 |
| KR | 10-2014-0121036 A | | 10/2014 |
| KR | 10-2021-0085910 A | | 7/2021 |
| KR | 102574717 B1 * | | 9/2023 |

OTHER PUBLICATIONS

Korean Written Decision on Registration of No. 10-2023-0116256
dated Dec. 1, 2023.

* cited by examiner

SYSTEM FOR PROVIDING MESSAGE TRANSMISSION AND RECEPTION SERVICE USING MESSAGE STANDBY STATION

CROSS-REFERENCE TO RELATED APPLICATION

This application claims priority to and the benefit of Korean Patent Application No. 10-2023-0116256, filed on Sep. 1, 2023, the entire disclosure of which is incorporated herein by reference in its entirety.

BACKGROUND

1. Field of the Invention

The present invention relates to a system for providing a message transmission and reception service using a message standby station, and more specifically, provides a platform configured to, when transmitting message content to an unspecified multitude, queue the message content in a message standby station and then allow the message content to be competitively received by receiving terminals.

2. Discussion of Related Art

With the advancement of information and communication technology and the proliferation of smart devices worldwide, various types of social media have emerged. The Internet and social networking services (SNSs) have become primary devices of communication for people, and businesses are also using various SNS channels as tools for communication and promotion, and social media have become the most influential marketing channel since the emergence of smartphones. Moreover, the Internet has completely changed the way people search for information and communicate with others, rapidly growing as one of the primary devices of social interaction and information sharing. As IT technology becomes more advanced, social media transcends the boundaries between mass media and personal media, enabling users to communicate not only with individuals but also with millions or even tens of millions of people. Due to such convenience, users use social media, such as online communities, to share new content and network with other users.

In this case, a method of increasing a message reception rate by setting a reception target of a message and then delivering the message or providing a reward according to reception of a message reception has been researched and developed. As the related arts, there are disclosed Korean Patent Publication No. 10-2021-0085910 (Jul. 8, 2021) and Korean Patent Publication No. 10-2009-0105799 (Oct. 7, 2009), respectively disclosing a configuration in which a message reception target is set based on pre-established personal information, and in response to responses being transmitted from receiving terminals, fees are paid to a personal information provider according to the volume of the responses transmitted, and a configuration in which, when a user terminal has subscribed to a service that inserts advertisements into an idle space of received messages each time a message is received by a user terminal, advertisements are inserted each time a message is received by the user terminal, and rewards are provided to the user terminal according to the number of received messages.

However, in the former case, collection of personal information is a prerequisite for setting the reception target, and thus various restrictions pursuant to relevant laws and regulations arise, and in the latter case, advertisements are uniformly inserted into each received message, and thus it is uncertain whether the received message, even when received, is effectively delivered. Recently, there are many cases in social media communities in which people gather or deliver messages under real names or anonymously, but it is still uncertain whether an unspecified or specified multitude will see the messages. Accordingly, there is a need for research and development on solutions to increase the reception rates when message content is written for an unspecified multitude.

SUMMARY OF THE INVENTION

The present invention is directed to providing a system for providing a message transmission and reception service using a message standby station that is capable of, when a transmitting terminal writes message content and requests that the message content be transmitted to an unspecified multitude, queuing the message content in a message standby station, and then allowing the messages in the message standby station to be competitively received by receiving terminals such that the message content may be voluntarily received rather than being passively received, and capable of inducing motivation and action to receive and confirm the message content such that not only the reach rate but also the awareness rate of the message content may be increased. However, the technical objectives of the present embodiments are not limited to the above, and other objectives that are not described above may become apparent to those of ordinary skill in the art based on the following description and the accompanying drawings.

According to an aspect of the present invention, there is provided an embodiment of the present invention, which includes a transmitting terminal configured to upload message content and transmit the message content to a message standby station for message transmission to an unspecified multitude, a receiving terminal configured to competitively receive a message queued in the message standby station, and a transmission and reception service providing server including a receiving unit configured to receive the message content from the transmitting terminal, a standby station management unit configured to, in response to a recipient being set as an unspecified multitude by the transmitting terminal, queue the message content in the message standby station, a processing unit configured to, in response to the message queued in the message standby station being competitively received by the receiving terminal, record processing of the reception in a log, and a statistics management unit configured to store statistical data on the message content of which the reception has been processed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
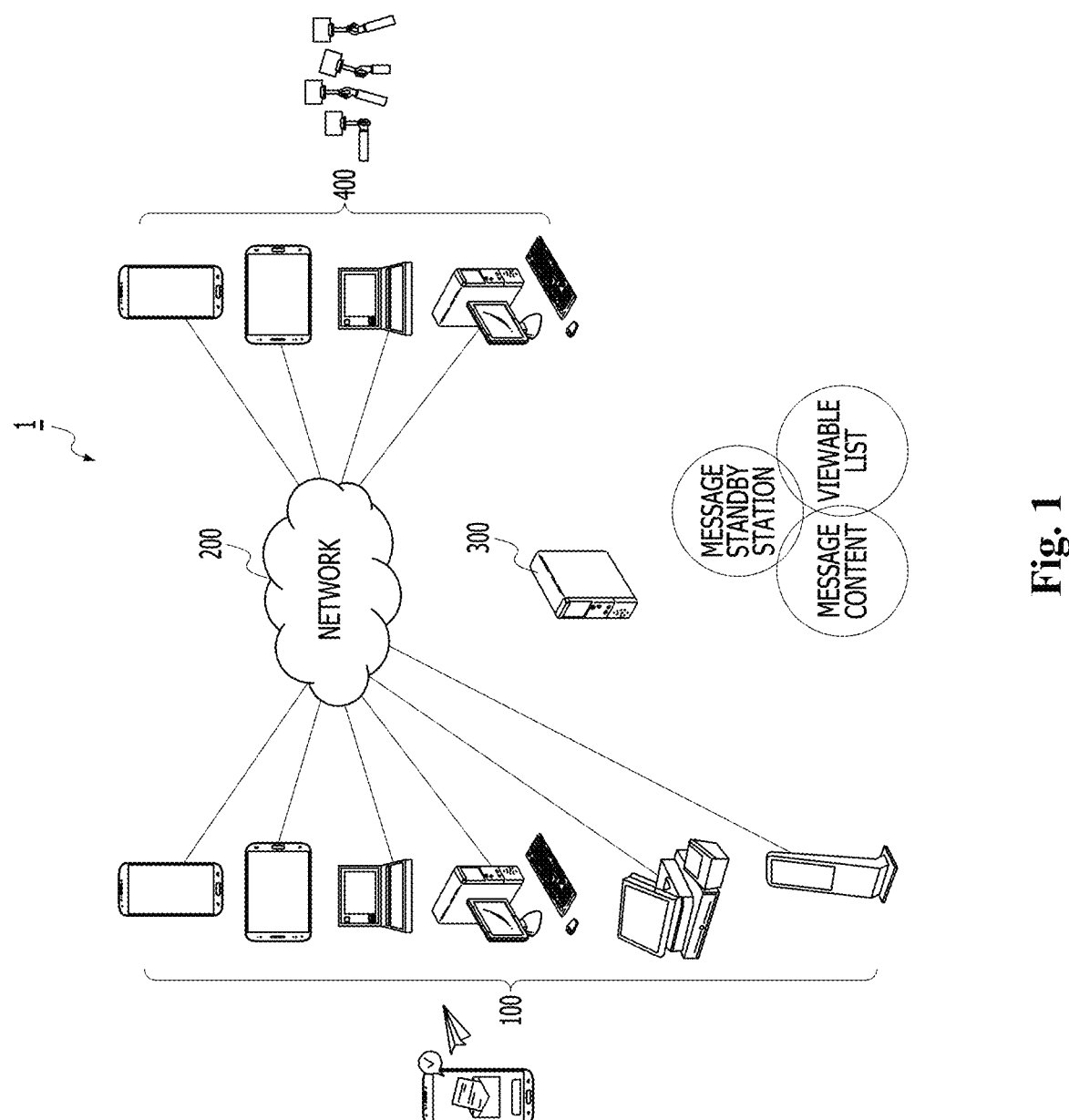
FIG. 1 is a diagram for describing a system for providing a message transmission and reception service using a message standby station according to an embodiment of the present invention.

Hereinafter, embodiments of the present invention will be described in detail with reference to the accompanying drawings so that those of ordinary skill in the art can easily implement the present invention. However, the present invention may be implemented in various different forms and is not limited to the embodiments described herein. In the drawings, parts irrelevant to the description are omitted in order to clearly describe the present invention, and similar reference numerals are attached to similar parts throughout the specification.

Throughout the specification, when a part is said to be "connected" to another part, this includes not only "directly connected" but also "electrically connected" with another element interposed therebetween. In addition, when a part "includes" a certain component, it does not mean that other components are excluded and other components or one or more other features may be further included unless specifically stated to the contrary. The presence or addition of any number, step, action, component, part, or combination thereof is not precluded.

The terms "about," "substantially," and the like, as used throughout the specification, are used to refer to ranges in or close to the stated numerical values when manufacturing and material tolerances specific to the stated meaning are presented, and are used to provide an understanding of the present invention. Accurate or absolute numerical values are used to prevent unreasonable use of the stated disclosure by unscrupulous infringers. As used throughout the specification of the present invention, the term "step" or "step of" does not mean "step for."

In the present specification, "unit" includes a unit realized by hardware, a unit realized by software, and a unit realized using both. Further, one unit may be realized by using two or more pieces of hardware, or two or more units may be realized by one piece of hardware. It should, however, be understood that the term "unit" is not limited to a software or hardware element. A "unit" may be implemented in addressable storage media. A "unit" may also be configured to reproduce one or more processors. For example, a "unit" may include various types of elements (e.g., software elements, object-oriented software elements, class elements, task elements, etc.), segments (e.g., processes, functions, attributes, procedures, sub-routines, program code, etc.), drivers, firmware, micro-code, circuits, data, databases, data structures, tables, arrays, variables, etc. Functions provided by elements and "units" may be formed by combining them into a smaller number of elements and "units" or may be divided into additional elements and "units." In addition, elements and "units" may also be implemented to reproduce one or more CPUs in devices or security multi-cards.

In the present specification, some of the operations or functions described as being performed by the terminal, apparatus, or device may be performed instead in a server connected to the terminal, apparatus, or device. Likewise, some of the operations or functions described as being performed by the server may also be performed by a terminal, apparatus, or device connected to the server.

In this specification, some of the operations or functions described as mapping or matching with the terminal are mapped or matched with the unique number of the terminal or the identification information of the individual, which is the identification information (identifying data) of the terminal.

Hereinafter, the present invention will be described in detail with reference to the accompanying drawings.

FIG. 1 is a diagram for describing a system for providing a message transmission and reception service using a message standby station according to an embodiment of the present invention. Referring to FIG. 1, a system 1 for providing a message transmission and reception service using a message standby station may include at least one transmitting terminal 100, a transmission and reception service providing server 300, and at least one receiving terminal 400. However, since the message transmission and reception service providing system 1 using the message standby station shown in FIG. 1 is only an embodiment of the present invention, the interpretation of the present invention is not restricted to FIG. 1.

In this case, components in FIG. 1 may be generally connected via a network 200. For example, as shown in FIG. 1, the at least one transmitting terminal 100 may be connected to the transmission and reception service providing server 300 via the network 200. In addition, the transmission and reception service providing server 300 may be connected to at least one transmitting terminal 100 and the at least one receiving terminal 400 via the network 200. Additionally, the at least one receiving terminal 400 may be connected to the transmission and reception service providing server 300 via the network 200.

Here, the network is a connection structure in which information exchange is performed between nodes such as a plurality of terminals and servers, and examples of the network include a local area network (LAN), a wide area network (WAN), the Internet (World Wide Web (WWW)), wired and wireless data communication networks, telephone networks, and wired and wireless television communication networks. Examples of the wireless data communication networks include 3G, 4G, 5G, $3^{rd}$ Generation Partnership Project (3GPP), $5^{th}$ Generation Partnership Project (5GPP), Long Term Evolution (LTE), World Interoperability for Microwave Access (WiMAX), Wi-Fi, the Internet, a LAN, a wireless LAN, a WAN, a personal area network (PAN), radio frequency (RF), a Bluetooth network, a near-field communication (NFC) network, a satellite broadcasting network, an analog broadcasting network, a Digital Multimedia Broadcasting (DMB) network, and the like, but the network according to the present invention is not limited thereto.

In the following, the term "at least one" is defined as including a singular form and a plural form, and even without the term "at least one," each component may be present in a singular or plural form, and refer to a singular or plural form. Additionally, whether each component is provided in a singular or plural form may vary depending on the embodiment.

The at least one transmitting terminal 100 is a transmitter's terminal that generates message content using a web page, app page, program, or application related to a message transmission and reception service using a message standby station and delivers the message content to an unspecified multitude or a specified multitude. Additionally, the transmitting terminal 100 may be a terminal that monitors a status of message content, and when a response is input from the receiving terminal 400, receives statistical data about the response and outputs the received statistical data. In addition, the transmitting terminal 100 may be a terminal that also outputs statistical data on a status, such as whether reception has occurred at the receiving terminal 400. In this case, the transmitter may be an individual, a corporation, an individual business, a company, a public institution, etc., but is not limited to those listed and is not excluded for reasons not listed.

Here, the at least one transmitting terminal 100 may be implemented as a computer capable of accessing a remote server or terminal through a network. Here, the computer may include, for example, a navigation system, a laptop computer, a desktop computer, etc. equipped with a web browser. In this case, the at least one transmitting terminal 100 may be implemented as a terminal capable of accessing a remote server or terminal through a network. The at least one transmitting terminal 100 may be, for example, a wireless communication device that ensures portability and mobility, and may be any type of handheld-based wireless communication device, such as a navigation terminal, a personal communication system (PCS) terminal, a global system for mobile communication (GSM) terminal, a personal digital cellular (PDC) terminal, a personal handyphone system (PHS) terminal, a personal digital assistant (PDA) terminal, an international mobile telecommunication (IMT)-2000 terminal, a code division multiple access (CDMA)-2000 terminal, a W-CDMA terminal, a wireless broadband (WiBro) terminal, a smartphone, a smartpad, or a tablet PC.

The transmission and reception service providing server 300 may be a server that provides a web page, app page, program, or application related to a message transmission and reception service using a message standby station. The transmission and reception service providing server 300 may be a server that, in response to message content being transmitted to an unspecified multitude, queues the message content in a message standby station, and performs setting such that the receiving terminal 400 competitively receives the message content. In addition, the transmission and reception service providing server 300 may be a server that, in response to a receiving target being set by the transmitting terminal 100, inserts message content into a viewable list of the receiving terminal 400 having conditions corresponding to the receiving target. In addition, the transmission and reception service providing server 300 may be a server that, in response to a reward for receiving the message content and a provision time of the reward being set by the transmitting terminal 100, provides the reward at the set provision time when the receiving terminal 400 provides the message content. In addition, the transmission and reception service providing server 300 may be a server that, in response to a viewing target being set to be restricted by the receiving terminal 400, performs setting such that message content having a restricted viewing target is prevented from being listed up as a viewing target. In addition, the transmission and reception service providing server 300 may be a server that collects responses corresponding to reports, replies, and termination of the receiving terminal 400, generates statistical data, and then provides the statistical data to the transmitting terminal 100 or the receiving terminal 400, and also a server that monitors the status of message content and then stores a result of the monitoring as statistical data and provides the statistical data.

Here, the transmission and reception service providing server 300 may be implemented as a computer capable of accessing a remote server or terminal through a network. Here, the computer may include, for example, a navigation system, a laptop computer, a desktop computer, etc. equipped with a web browser.

The at least one receiving terminal 400 may be a receiver's terminal that restricts a viewing target, views message content inserted into a viewable list, or competitively receives message content in a message standby station set for an unspecified multitude using a web page, app page, program, or application related to a message transmission and reception service using a message standby station. In this case, the receiving terminal 400 may be a terminal that generates a response event corresponding to one of report, reply, and termination, and upon receiving message content for which a reward is set, receives the reward at a preset provision time.

Here, the at least one receiving terminal 400 may be implemented as a computer capable of accessing a remote server or terminal through a network. Here, the computer may include, for example, a navigation system, a laptop computer, a desktop computer, etc. equipped with a web browser. In this case, the at least one receiving terminal 400 may be implemented as a terminal capable of accessing a remote server or terminal through a network. The at least one receiving terminal 400 may be, for example, a wireless communication device that ensures portability and mobility, and may be any type of handheld-based wireless communication device, such as a navigation terminal, a PCS terminal, a GSM terminal, a PDC terminal, a PHS terminal, a PDA terminal, an IMT-2000 terminal, a CDMA-2000 terminal, a W-CDMA terminal, a WiBro terminal, a smartphone, a smartpad, or a tablet PC.

Figure 2:
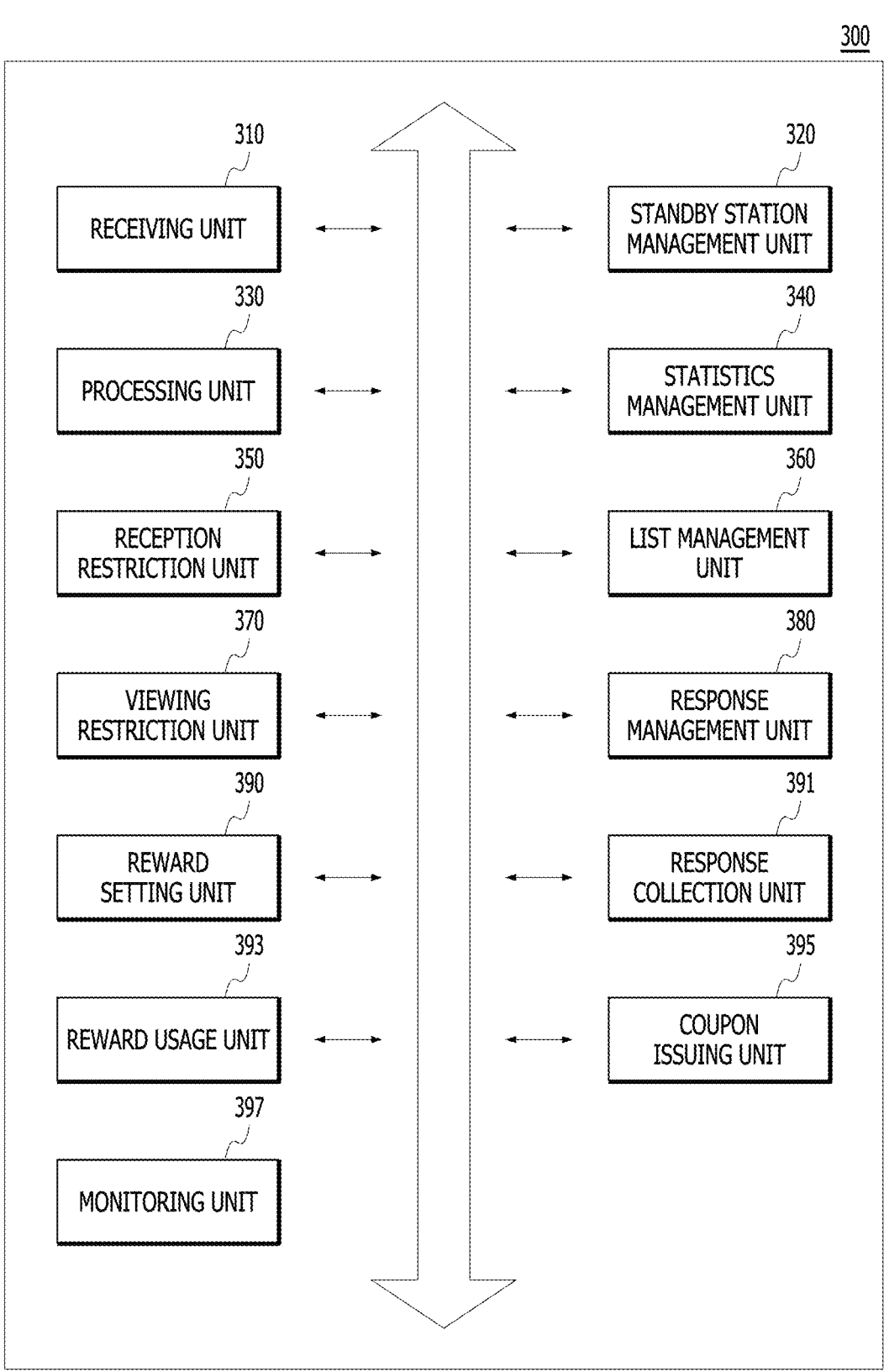
FIG. 2 is a block diagram illustrating a transmission and reception service providing server included in the system shown in FIG. 1.

FIG. 2 is a block diagram illustrating a transmission and reception service providing server included in the system shown in FIG. 1. FIGS. 3A to 3N and 4A to 4F are diagrams for describing an embodiment in which a message transmission and reception service using a message standby station is implemented according to an embodiment of the present invention.

Referring to FIG. 2, the transmission and reception service providing server 300 may include a receiving unit 310, a standby station management unit 320, a processing unit 330, a statistics management unit 340, a reception restriction unit 350, a list management unit 360, a viewing restriction unit 370, a response management unit 380, a reward setting unit 390, a response collection unit 391, a reward usage unit 393, a coupon issuing unit 395, and a monitoring unit 397.

When the transmission and reception service providing server 300 according to the embodiment of the present invention or another server (not shown) operating in conjunction with the transmission and reception service providing server 300 transmits an application, program, app page, web page, etc. related to a message transmission and reception service using a message standby station to at least one transmitting terminal 100 and at least one receiving terminal 400, the at least one transmitting terminal 100 and the at least one receiving terminal 400 may install or open the application, program, app page, web page, etc. related to the message transmission and reception service using a message standby station. Additionally, the service program may be run on the at least one transmitting terminal 100 and the at least one receiving terminal 400 using a script executed in a web browser. Here, a web browser is a program that enables the use of web (WWW) services and is a program that receives hypertext written in hypertext mark-up language (HTML) and displays content. For example, the web browser may be Netscape, Explorer, Chrome, etc. Additionally, an application is an application program on a terminal and examples of the application include an app running on a mobile terminal (a smartphone).

Before describing FIG. 2, definitions of terms used in an embodiment of the present invention are summarized in Table 1 below. However, it is obvious that various definitions may be applied depending on the embodiment in addition to the definitions in Table 1.

TABLE 1

| Term | Definition |
| --- | --- |
| Message | A unit of communication sent via a short message service (SMS), multimedia messaging service (MMS), and long message service (LMS) through circuit-switched (CS) or LTE networks or transmitted through messengers, bulletin boards or communities. |
| Message content | Content including text, photos, images, sound sources, and videos |
| Store | Divided into individual stores, individual business stores, and corporate business stores depending on the entity opening the stores. Individual stores are stores that do not have a business registration number and allow for person-to-person (P2P) second-hand transactions. Individual business stores and corporate business stores are stores that require a business registration number, and are located in online and offline shopping malls, and have the authority to register products, sell products, issue coupons, and transmit messages. |
| Reward | Virtual currency including coupons, mileage, items, points, etc. |
| Transmitting terminal | A terminal owned by a transmitter and transmitting message content |
| Receiving terminal | A terminal that competitively receives message content queued in a message standby station or receives message content in a viewable list. |
| Viewable list | A list in which message content is listed up by registration of personal information and keywords. |
| Receiving target | Region, personal information, and keywords set by a transmitting terminal for targeting. |
| Message standby station | A place in which message content is allowed to stay in a server without being immediately transmitted to a receiving terminal before being received by a receiving terminal that satisfies preset conditions. |
| Validity period | Duration during which message content can stay in a message standby station. |
| Reception waiting state | A state in which message content stays in the message standby station. |
| Received state | A state in which message content from a message standby station has been delivered to a receiving terminal. |

Referring to FIG. 2, the receiving unit 310 may receive message content from the transmitting terminal 100. The transmitting terminal 100 may upload message content. The message content may be a message allowed to be competitively received by an unspecified multitude, or a message transmitted by setting a receiving target. The type of message may be a message that is required to only reach a recipient, that is required to only be received by a recipient, or a message that requires a response of the recipient. A reward added to the message may be a reward receivable when the recipient receives the message, or a reward receivable only when the recipient responds to the message. In this case, the reward may be a coupon or points, but is not limited thereto.

The standby station management unit 320 may queue message content in the message standby station in response to an unspecified multitude being set as a recipient by the transmitting terminal 100. The transmitting terminal 100 may transmit message content to a message standby station to transmit messages to the unspecified multitude. In this case, standby refers to a state in which a message, when received from the transmitting terminal 100, is allowed to stay in the message standby station of a platform according to the present invention without being transmitted to the receiving terminal 400, similar to asynchronous communication. In other words, standby is a state of only the presence of a message that is present on the platform according to the present invention and receivable by the receiving terminal 400. In order to view the message content, the receiving terminal 400 needs to compete with other receiving terminals 400 and receive the message. For example, when the quantity is limited, message content may be received by the receiving terminal 400 on a first-come, first-served basis, and the receiving terminal 400 may open the message content to output the message content.

The processing unit 330 may, in response to a message queued in the message standby station being competitively received by the receiving terminal 400, record processing of the reception in a log. The receiving terminal 400 may perform competition and receive messages queued in the message standby station. In this case, as described above, the reception may be achieved on a first-come, first-served basis, but when the transmitter sets other conditions, the processing unit 330 may perform setting such that recipients having a high matching rate with the conditions may receive the message content with a higher probability. Alternatively, the probability may be set to be completely random, or vary depending on the embodiment. In this case, when unreceived messages in the message standby station correspond to a standard set by the platform according to an embodiment of the present invention, the processing unit 330 may process the unreceived messages by receiving a transmission cancellation of the transmitting terminal 100.

The statistics management unit 340 may store statistical data on message content of which reception has been processed. For example, referring to FIG. 3E, the statistics management unit 340 may store statistical data on statuses based on message delivery stages, for example, when there are 1 million pieces of message content to be transmitted by the transmitter, 300,000 pieces of message content waiting to be received, 300 pieces of message content being received, 50 pieces of message content having been responded to, 20 pieces of message content being reported, 40 pieces of message content only received, output, and terminated without response, and the like. In addition, when there are responses, the statistics management unit 340 may provide statistical data, similar to aggregating survey responses, including the number of responses for each question or the distribution of responses.

The reception restriction unit 350 may, in response to a reception target being set by the transmitting terminal 100, perform setting such that a receiving terminal 400 corresponding to at least one condition matching with the receiving target receives the message content. For example, assuming that an apartment manager election is conducted as shown in FIG. 4C, the apartment manager election is only open to residents of the apartment, and the reception restriction unit 350 may, when an area is set based on the locations of the apartment residents, allow message content to be received only by the receiving terminal 400 located in the area.

The list management unit 360 may, when recipient information about a recipient is set and stored by the receiving terminal 400, identify whether the receiving terminal 400 corresponds to a reception target and determine whether to perform addition to a viewable list of the receiving terminal 400. When the recipient of the receiving terminal 400 enters various information of the recipient, such as hobbies, interests, residence, gender, age, and occupation, and the transmitting terminal 100 specifies the reception target, the list management unit 360 may transmit message content to the viewable list of the receiving terminal 400 having recipient information corresponding to a specific condition. Even in this case, the message is queued as the viewable list in the message standby station rather than being transmitted to the receiving terminal 400.

The viewing restriction unit 370 may, in response to a viewing target being set to be restricted by the receiving terminal 400, perform setting such that message content with the restricted viewing target is not listed as a viewing target of the receiving terminal 400. This may provide an option to set a target of which reception by the receiving terminal 400 is desired to be rejected. Message content with restricted viewing content is not added to the viewable list even when the message content is located in the message standby station. For example, when the recipient has set a setting indicating that message content related to topic A is not desired, the viewing restriction unit 370 may reject receipt, i.e. restrict the viewing target, by adding keywords related to topic A to. Alternatively, when the recipient has set a setting indicating that he or she does not want to receive message content transmitted from phone number B, message content transmitted from phone number B is prevented from being listed up as a viewing target.

The response management unit 380 may, after the receiving terminal 400 receives message content corresponding to the viewing target, provide an option to transmit one of a report, reply, and termination response on the message content. When the message content includes profanity, slander, discrimination, harassment, or sexual content, the response management unit 380 may receive a report regarding the profanity, slander, discrimination, harassment, or sexual content. Subjects of reporting are not limited to those described above. As for the reply, for example, referring to FIG. 3K, when the message content is related to a fishing gathering and the question shown in FIG. 3K is written to identify the preferences of people participating in the fishing gathering, the reply may involve selecting one of presented options. Additionally, to enhance interest in the fishing gathering, the message content may provide a quiz to guess the number of members or involve selecting a preferred menu for a gathering. In this case, methods of conducting surveys include, for example, as shown in FIG. 3M, a combo box, an image combo box, an option selection, an image option selection, a check box, an image check box, a multiple choice item, an image multiple choice, a text box (a keyboard input), and the like, but the method is not limited thereto. The termination involves closing a message content window after confirming the message content, which is the received message.

The reward setting unit 390 may provide an option to set a reward for the receiving terminal 400 that has received the message content from the transmitting terminal 100 and a provision time of the reward and transmit the reward and the provision time of the reward. For example, referring to FIG. 3N, assuming that wedding invitations are transmitted to acquaintances, the reward setting unit 390 may set how to obtain rewards or when the rewards are provided, for example, by setting the message content for which rewards (points) are to be given in a competitive manner, for example, within the first N people, or for which rewards to be given in the case of a question being responded to. In this case, the time of acquisition may be set, for example, to acquisition upon receipt (on a first-come, first-served basis), acquisition upon response, acquisition upon response (on a first-come, first-served basis), acquisition upon selective response, acquisition upon selective response (on a first-come, first-served basis), acquisition when the selective response is correct, and acquisition when the selective response is correct (on a first-come, first-served basis), but the time of acquisition is not limited thereto.

The response collection unit 391 may, in response to at least one question being included in the message content by the transmitting terminal 100, collect the responses received from the receiving terminal 400 and generate statistical data and provide the generated statistical data to the transmitting terminal 100 or the receiving terminal 400. For example, in the case of FIG. 4C, voting is conducted by electronic voting, in which it is difficult to manually count each vote. According to one embodiment of the present invention, the response collection unit 391 may collect information about which voter voted for which candidate or how many votes each candidate received. The results may be shared in real time, or may be announced after a preset time since real-time results may affect the voting. It is understood that such a setting may be subject to change depending on the apartment regulations or the agreement of each resident.

The reward usage unit 393 may, in response to a reward being received by the responding terminal 400 due to receiving message content or responding to message content, set the reward to be used for at least one product or service at a pre-established shopping mall. Rewards (points or coupons) acquired by each receiving terminal 400 competitively or by receiving or responding to the message content may be set to be used when making payments at online and offline stores, as shown in FIG. 4D.

The coupon issuing unit 395 may, in response to message content, into which a coupon is inserted, being transmitted by the transmitting terminal 100, perform setting such that the coupon is used at a store of the transmitting terminal 100 by the receiving terminal 400 having received the message content. Referring to FIG. 4D, when the transmitter of the transmitting terminal 100 is an individual business owner, company, or the like, information regarding until what time a certain coupon may be used for purchasing a certain product at a certain store is generated in a database, and when a quick response (QR) code including a uniform resource locator (URL) corresponding the conditions is scanned or recognized by a store terminal (not shown), the coupon issuing unit 395 may identify whether the conditions are satisfied, and determine whether to apply the coupon such that the coupon may be used for payment.

The monitoring unit 397 may monitor the current location and status of the message content and generate statistical data and store the generated statistical data. Since the message content according to the embodiment of the present invention uses asynchronous communication, which is the concept of a message standby station, the message is not immediately delivered to the recipient's receiving terminal 400 only because the transmitter transmits the message. Accordingly, the monitoring unit 397 may identify statuses, such as whether the message is currently queued in the message standby station or whether the message is being received competitively by the receiving terminals 400. In a case in which the message has been transmitted to the receiving terminal 400, the monitoring unit 397 may distinguish and identify statuses such as whether the message content has been opened, i.e., confirmed to be output on the screen, or has been received but not yet opened. In addition, the monitoring unit 397 may, when there is a question in the message content, provide information regarding whether the question has been answered or not yet answered, and when the question has been answered, the number and type of answers, as statistical data.

The differences between the transmission and reception service according to the embodiment of the present invention and that of another company's platform may be compared as shown in Table 2. Whether the recipient is specified represents a need to identify phone numbers or messenger accounts to transmit the message. Most communication channels require each account or phone number to deliver message content to the other party, but the platform according to the embodiment of the present invention may provide message content to an unspecified multitude without identifying the other party's number or account, distinguishing it from other companies' technologies in terms of the level of personal information protection. In addition, consideration of reception rejection involves whether a message is blocked at a server end rather than a receiving end of the receiving terminal 400 when the other party rejects reception of the message. When reception rejection is performed at the smartphone, message content is allowed to always remain in a blocked message box of the smartphone because the message content is delivered to the smartphone (the receiving end). However, the platform according to an embodiment of the present invention blocks blocked messages at the server end while preventing the blocked messages from being delivered to the receiving end, and thus the messages are not left even in the blocked message box of the recipient's smartphone. Since the reception competition, statistical functions, and survey functions are the same as described above, redundant descriptions will be omitted.

additionally include pre-viewing reference information such that the receiving terminal 400 determines whether to selectively receive message content. For example, the viewing reference information may include the nature of the message, the title of the message, content of the message, whether the message requires a reply, a first-come, first-served basis of the message, a password of the message, a validity period of the message, and the like. The transmitting terminal 100 may, when transmitting message content to an unspecified multitude, set demographic data, such as a region, an age group, a gender, a personality, an occupation, a hobby, and the like, as a receiving target. The transmitting terminal 100 may set a validity period for receiving message content, and may also set a provision time of a reward, and the like. In this case, the transmitting terminal 100 may request cancellation of transmission (recall) for unreceived messages staying in the message standby station that correspond to predetermined conditions. In this case, the transmitting terminal 100 may request processing of recall by deducting a cost of the messages incurred from being queued in the message standby station depending on the point in time of recall, and the platform according to the present invention may proceed with recall processing.

<Message Standby Station→Reception Competition>

The receiving terminal 400 may refer to the viewing reference information of the message content included in the viewable list, and determine whether to receive the message. Additionally, the receiving terminal 400 may, when receiv-

TABLE 2

| | Whether recipient is specified | Consideration of reception rejection | Reception competition | Statistical functionality | Survey functionality |
|---|---|---|---|---|---|
| Present invention | X | ○ | ○ | ○ | ○ |
| SMS/LMS/MMS | ○ | X | X | X | X |
| Pinterest | ○ | X | X | X | X |
| KakaoTalk | ○ | X | X | X | ○ |
| Chat app/messenger | ○ | ○ | X | X | X |
| Social media | ○ | ○ | X | X | X |

Hereinafter, an operation process according to the configuration of the transmission and reception service providing server shown in FIG. 2 described above will be described in detail with reference to FIGS. 3A to 3N and 4A to 4F. However, it will be apparent that the embodiment is only one of various embodiments of the present invention and is not limiting.

Figure 3A:
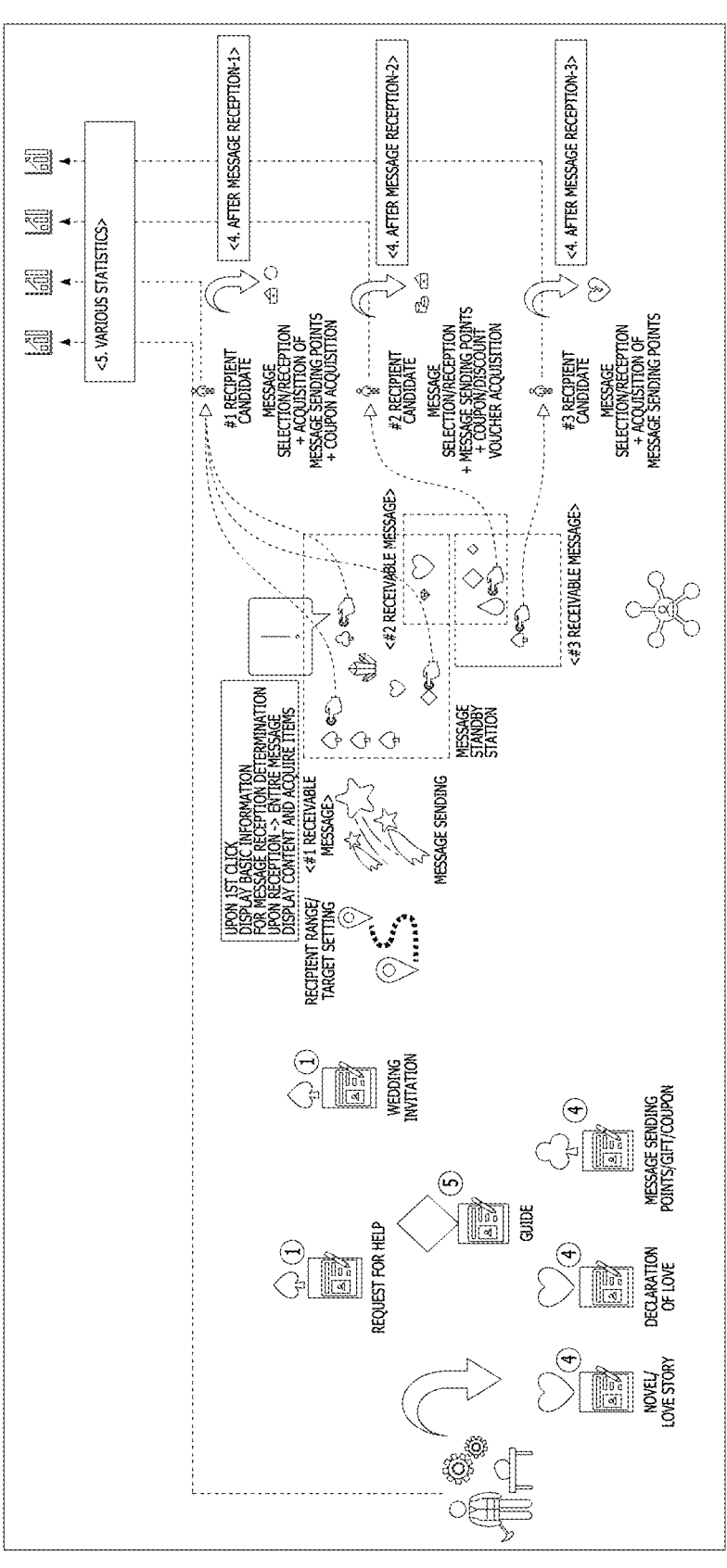
FIGS. 3A to 3N and 4A to 4F are diagrams for describing an embodiment in which a message transmission and reception service using a message standby station is implemented according to an embodiment of the present invention.

As shown in FIG. 3A, the transmission and reception service according to an embodiment of the present invention proceeds in the following flow: [transmission→message standby station→reception competition→reception→statistics].

<Transmission>

In the operation of [transmission], the transmitting terminal 100 may define items of message content, content of message content, and a recipient's response method of message content, and set statuses of message content [before transmission-during transmission-before reception-after reception] with text or content, such as characters, symbols, and images, and set different icons of rewards, such as points, coupons, and gifts. Since the setting is related to a design user interface (UI), details thereof are not described in the embodiment of the present invention. The transmitting terminal 100 may pay a predetermined cost to transmit message content, and the receiving terminal 400 may also have a reception cost deducted. The message content may ing message content, acquire rewards such as points, coupons, mileage, and gifts according to the settings of the transmitting terminal 100. The same message content transmitted from the transmitting terminal 100 to a plurality of receiving terminals 400 may be set to be received only once to prevent abuse due to duplicate reception. Points received by the receiving terminal 400 may be used when transmitting message content from the receiving terminal 400 to another terminal (not shown). In this case, when there is no receiving terminal 400 capable of receiving the message content, or when the validity period elapses without the message content being competitively received by the receiving terminals 400, the message content may be automatically destroyed, or the transmitting terminal 100 may cancel transmission of the message content, and thus the message content may no longer be viewed at the receiving terminal 400.

<Reception>

In the case of a survey or response being requested by the transmitting terminal 100, the receiving terminal 400 may select a response or enter a reply, and when points, i.e., rewards, acquirable by response or entry are set by the transmitting terminal 100, a preset reward may be paid to the receiving terminal 400 upon response or entry. Upon setting, by the transmitting terminal 100, coupons, discount coupons and the like to be set to be acquired only by encouraging access to an advertising page or watching advertisement content, the receiving terminal 400 may acquire the rewards only by acting as desired by the transmitter. When the message content contains hate, threats, hatred, profanity, etc., the receiving terminal 400 may report the message content by selecting [Report]. In this case, the transmission and reception service providing server 300 automatically restricts the use of the account of the transmitting terminal 100 when the percentage of reports received exceeds a preset percentage of the total number of messages transmitted from the transmitting terminal 100. In this case, civil and criminal proceedings may also proceed.

<Statistics>

The transmission and reception service providing server 300 may visualize statistical data on the delivery status of the message content, such as pre-transmission, post-transmission, pre-reception, and post-reception, as well as statistical data provided by collecting responses, and provide the visualized statistical data together with visualized evidence data.

Figure 3B:
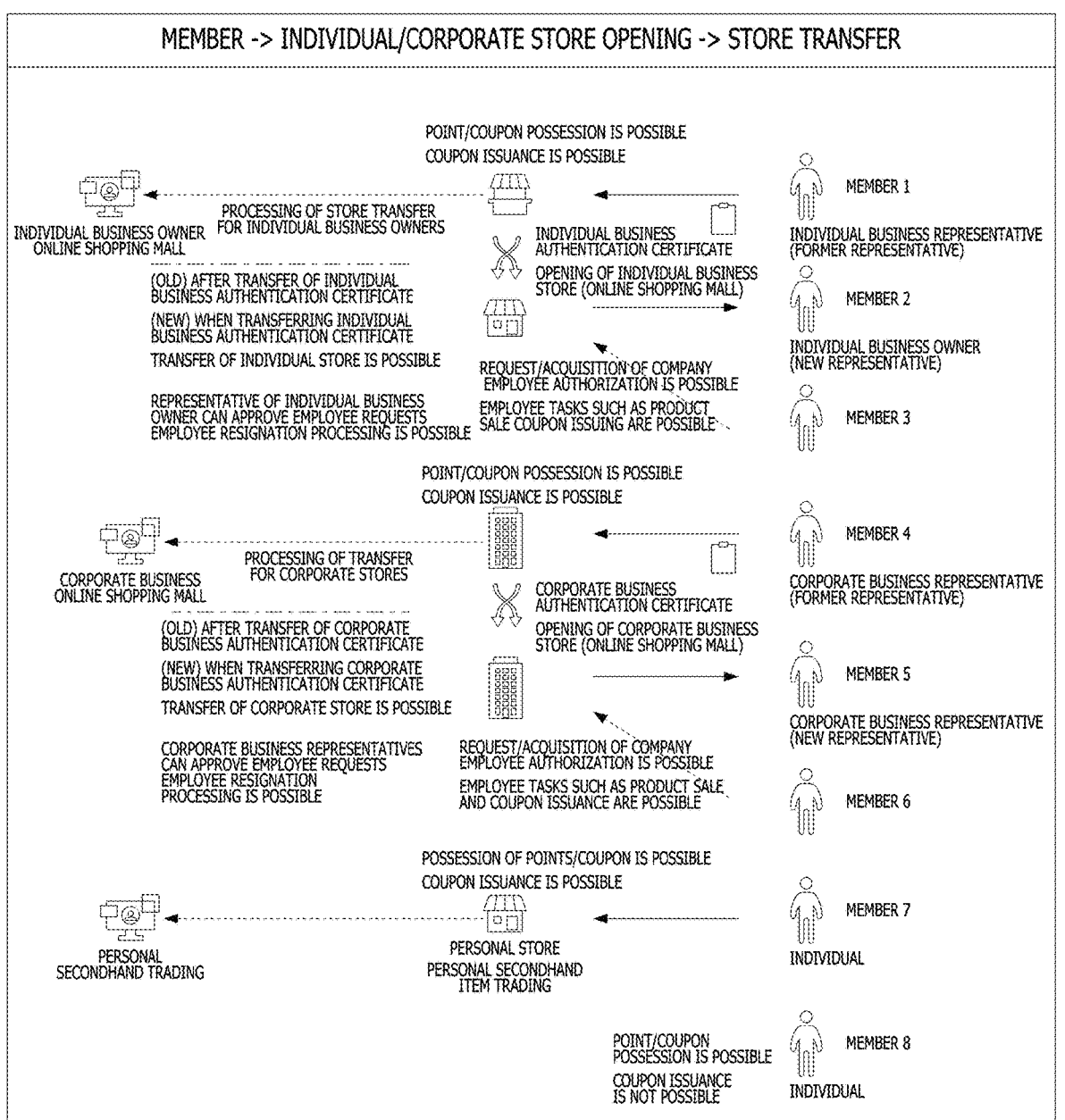
Figure 3C:
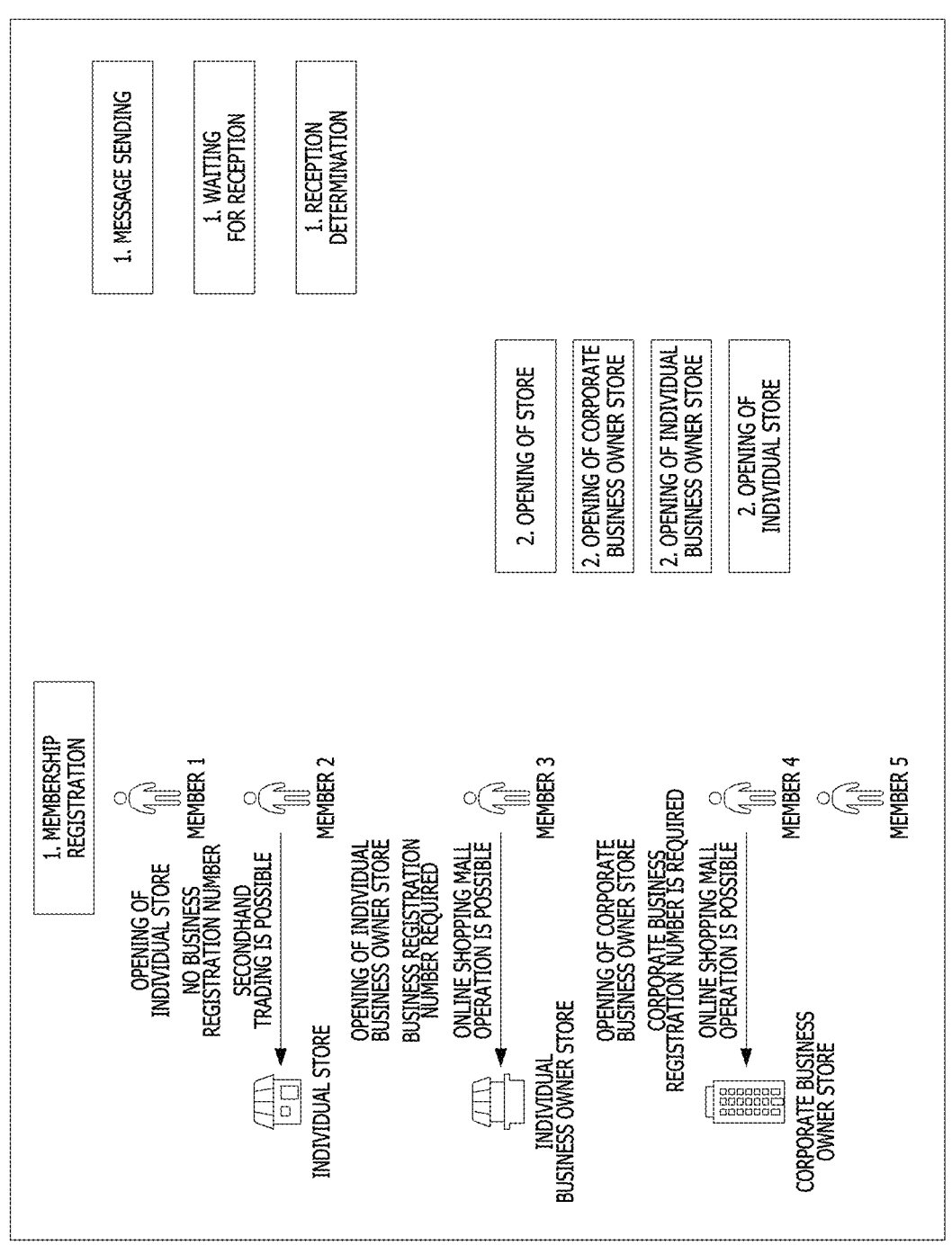

Referring to FIG. 3B, possession and issuance of points are distinguished between users with business registration numbers and users without business registration numbers, and a process of transfer (sell and buy) of a store once opened is illustrated. When a store, once opened, is transferred, the rights may be transferred comprehensively or partially, depending on consultation and agreement between the transaction parties. Therefore, the embodiment of the present invention may provide corresponding functions based on relationships, such as transfer, delegation, and the like. The transmission and reception service providing server 300 may set the authority to be granted to a store entering a shopping mall, as shown in FIG. 3C.

Figure 3D:
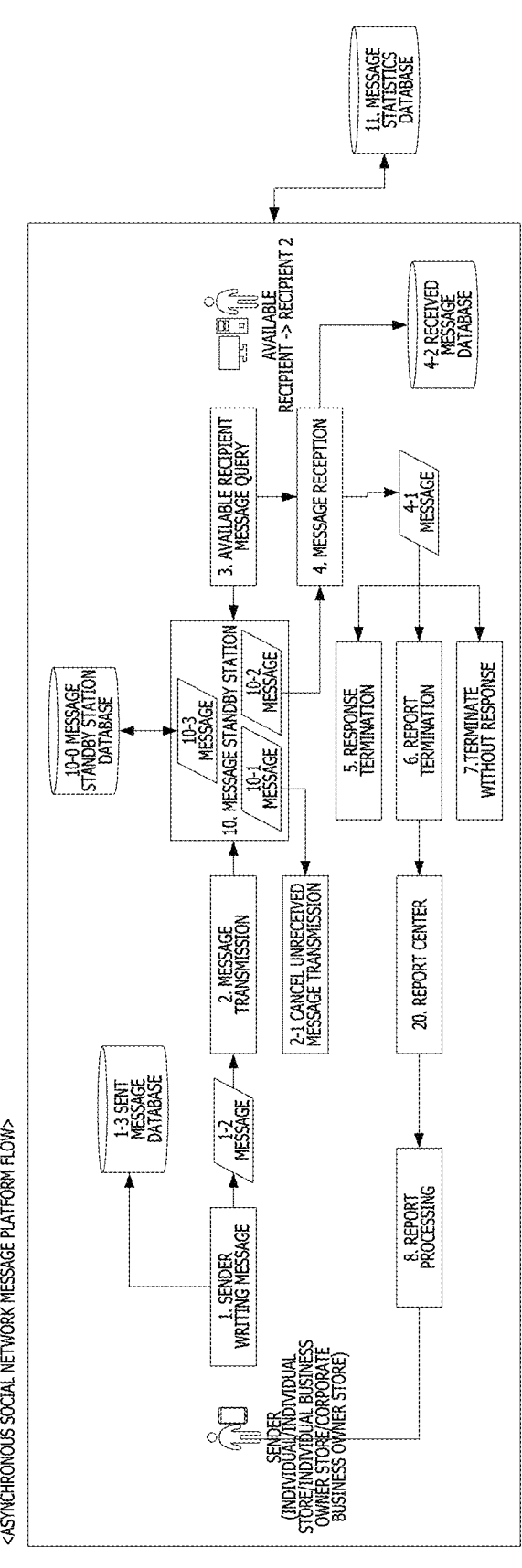
Figure 3E:
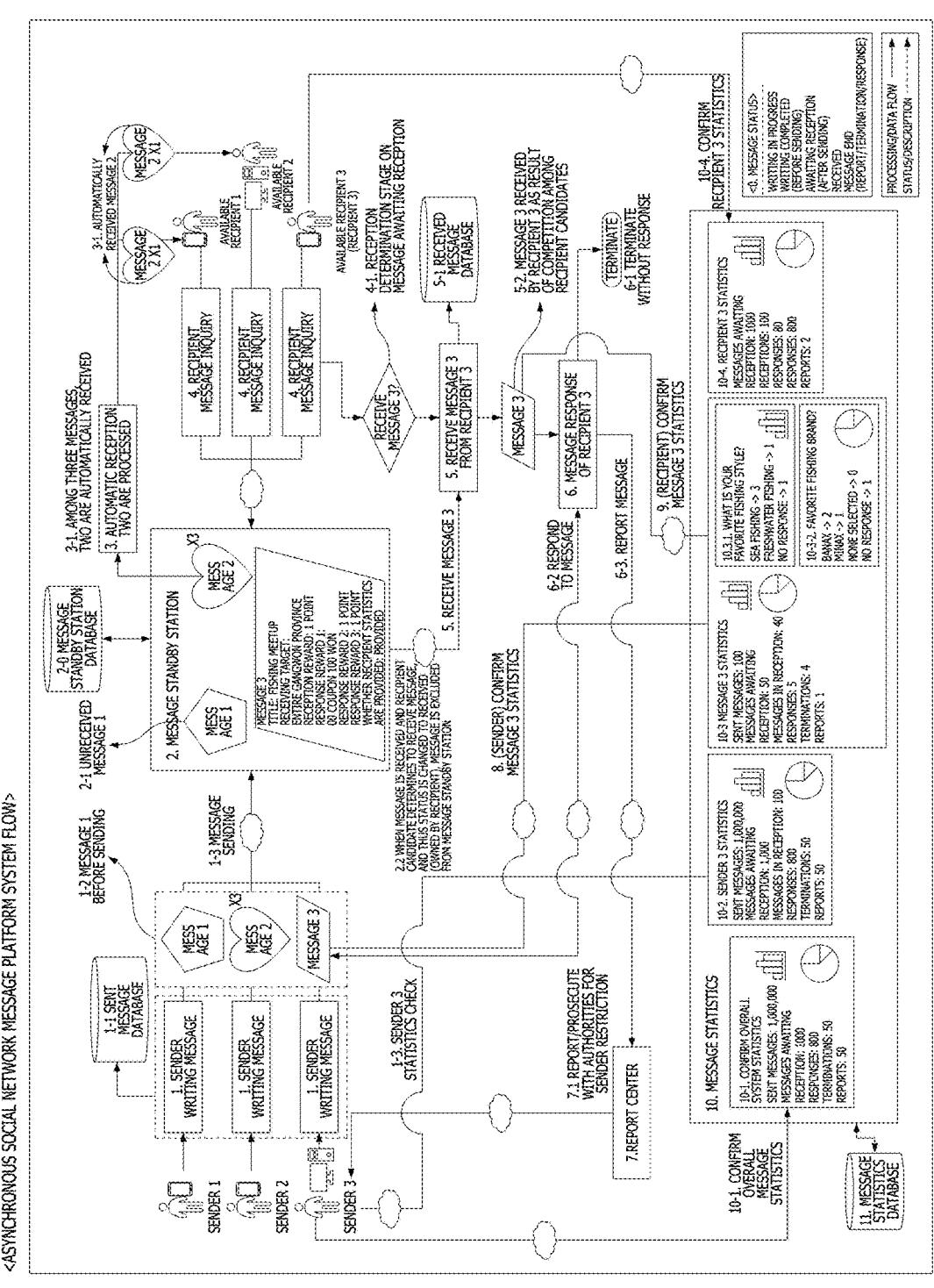
Figure 3F:
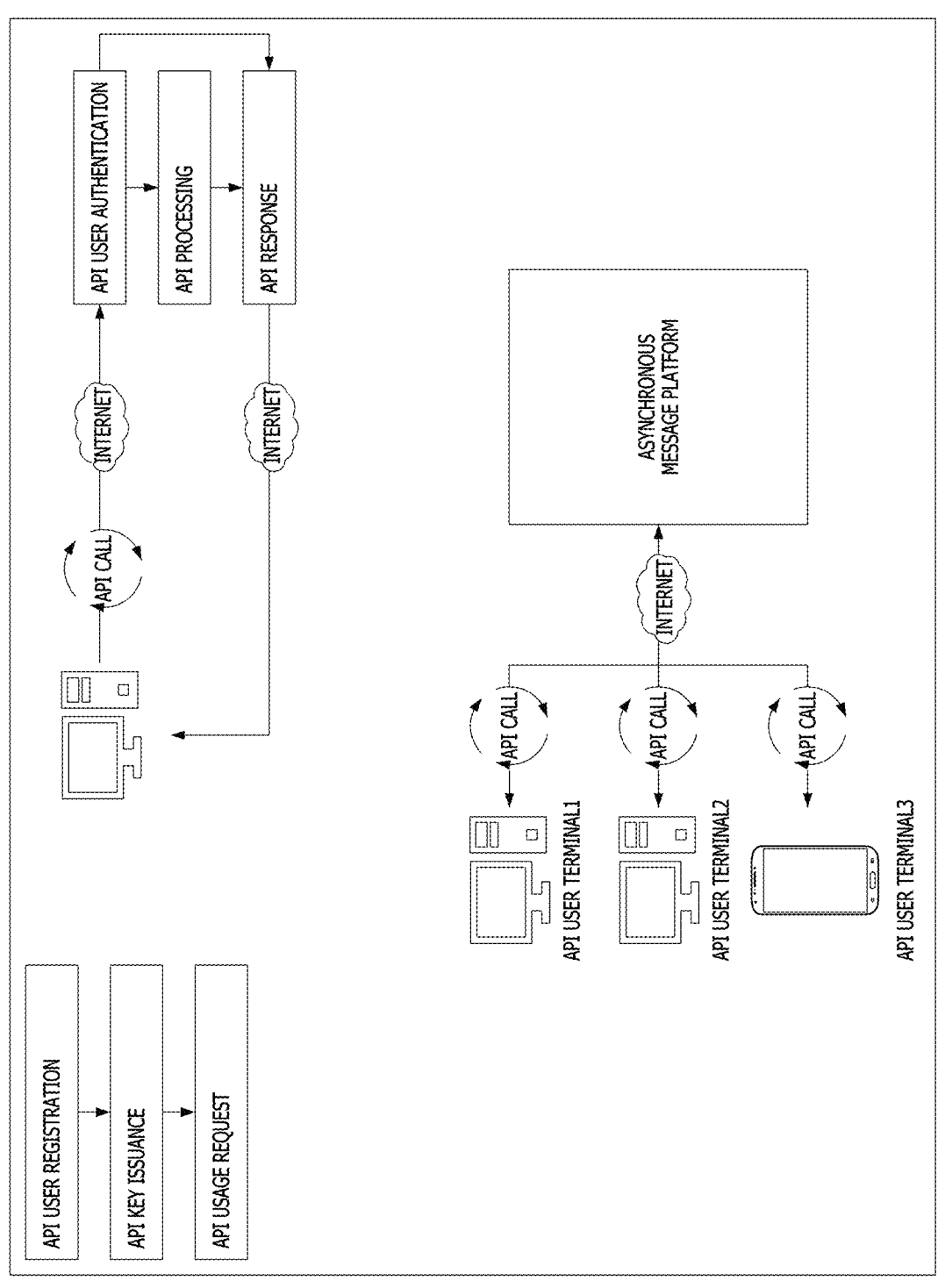
Figure 3G:
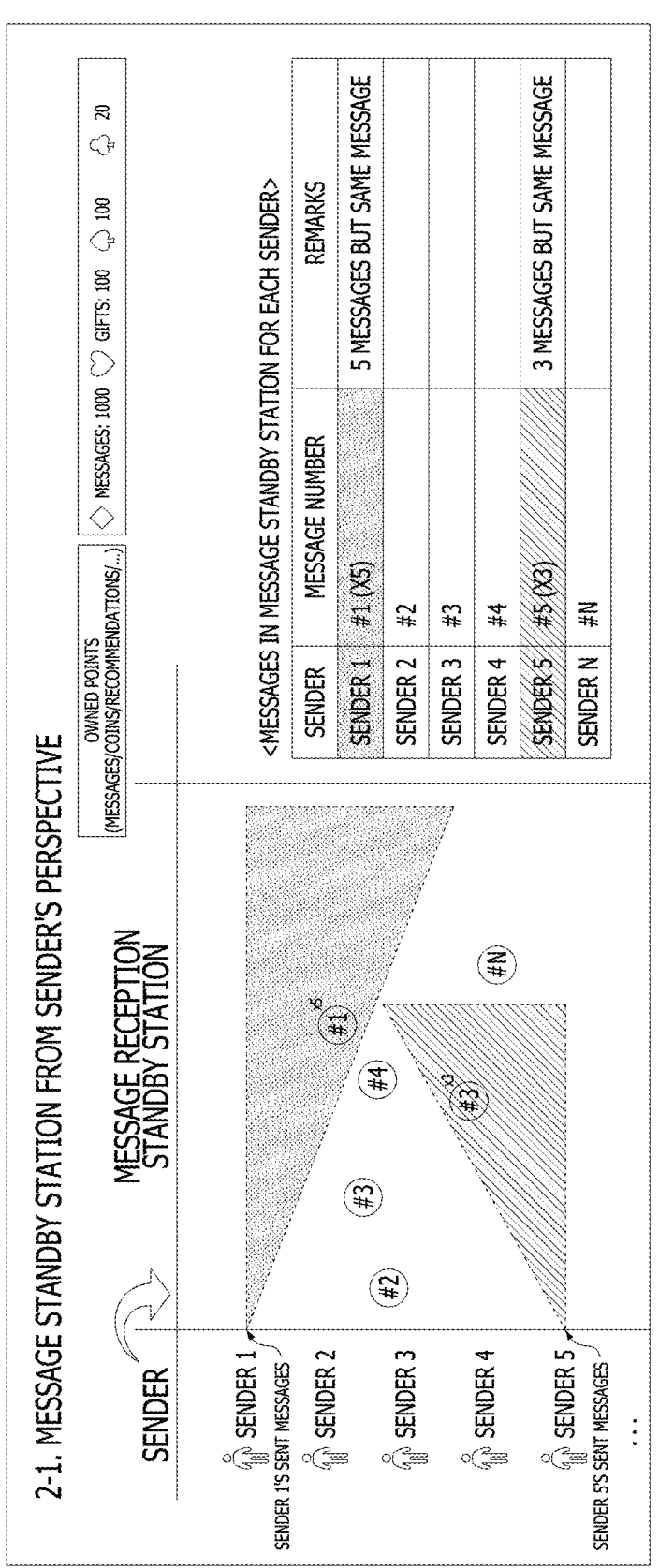
Figure 3H:
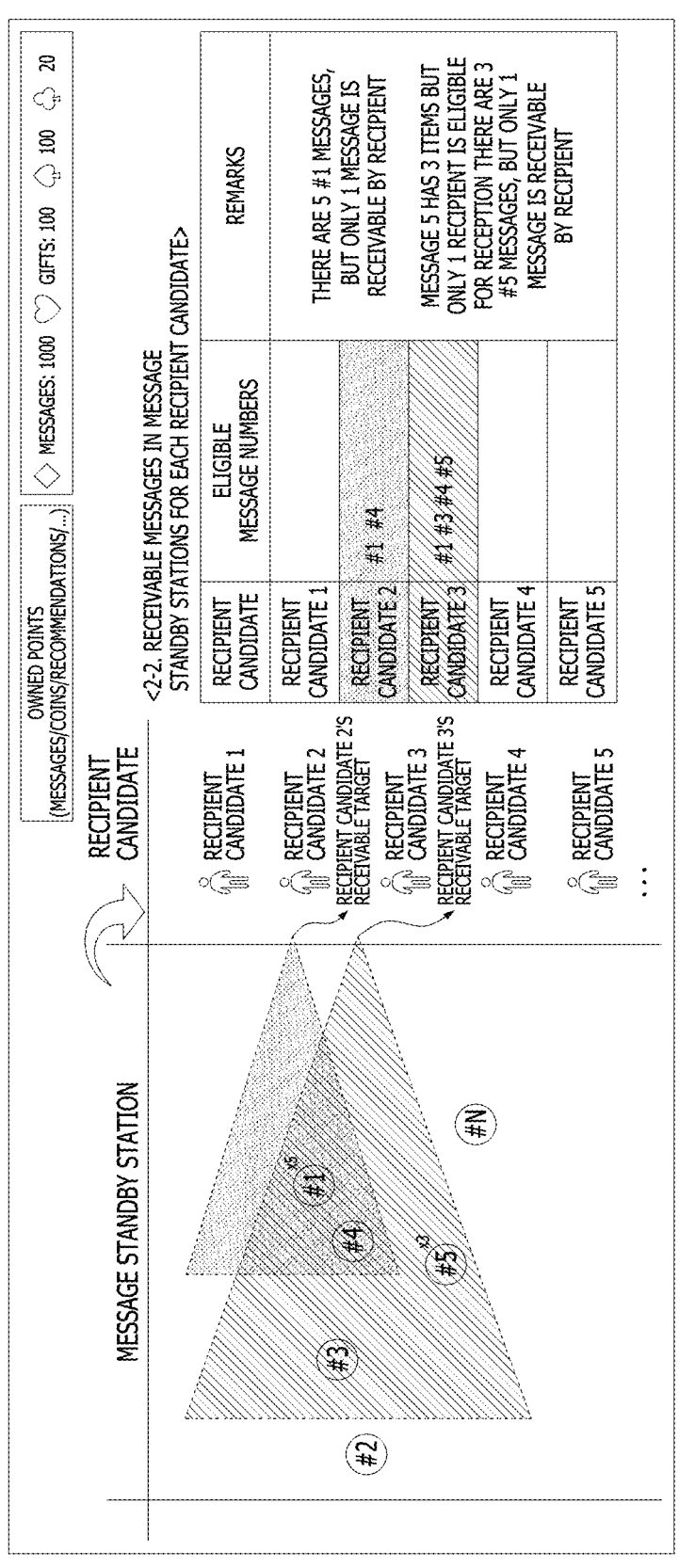
Figure 3I:
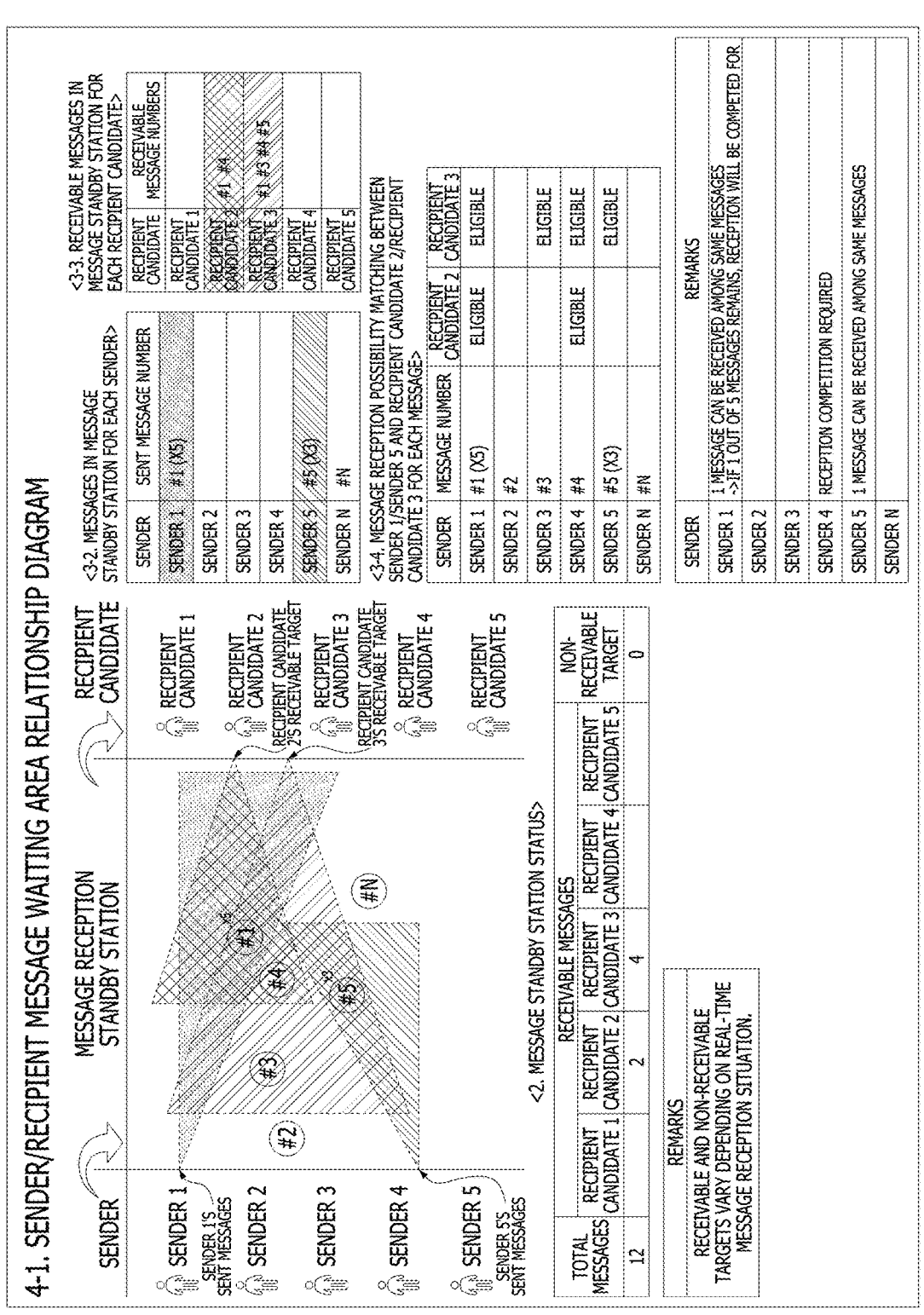
Figure 3J:
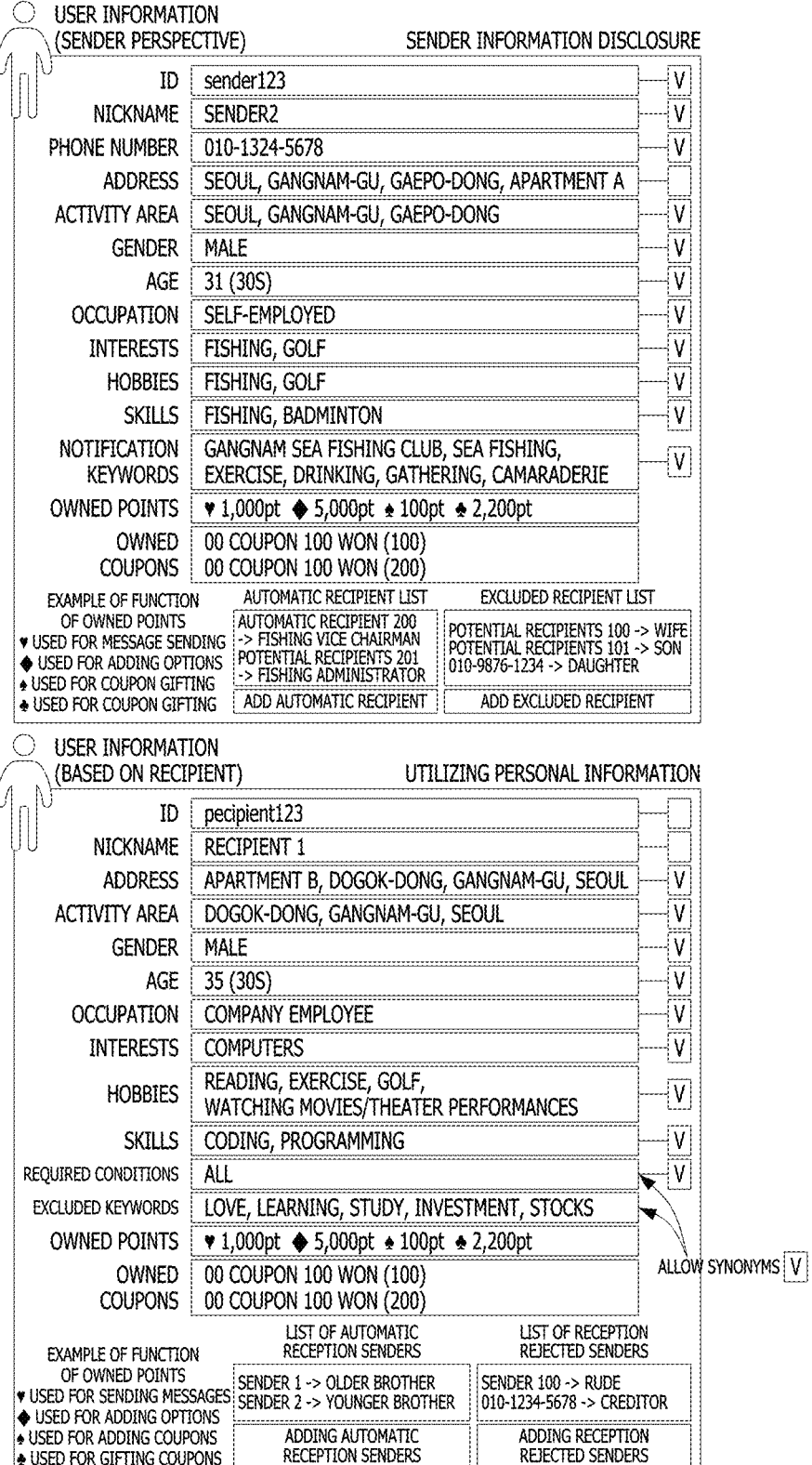
Figure 3K:
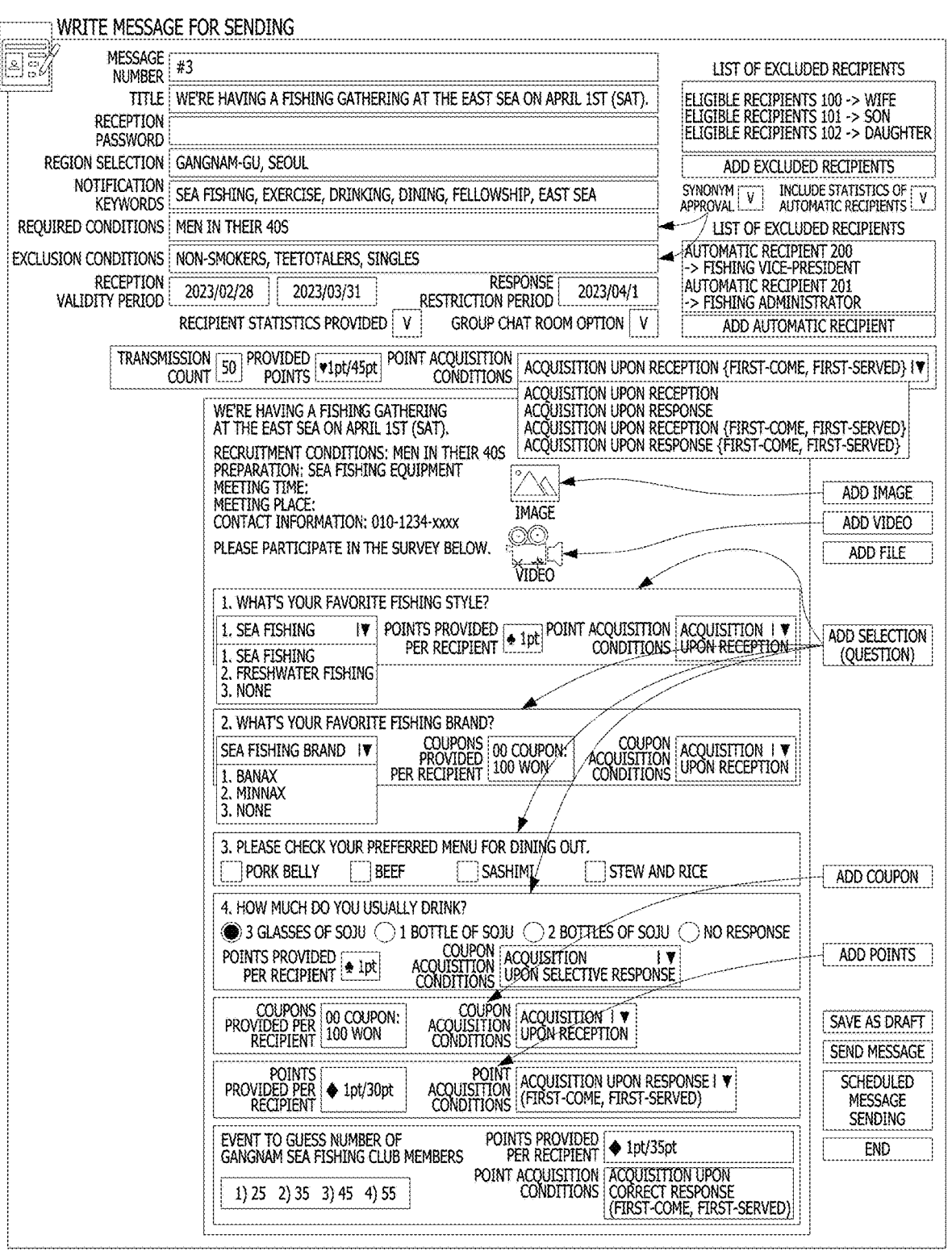
Figure 3L:
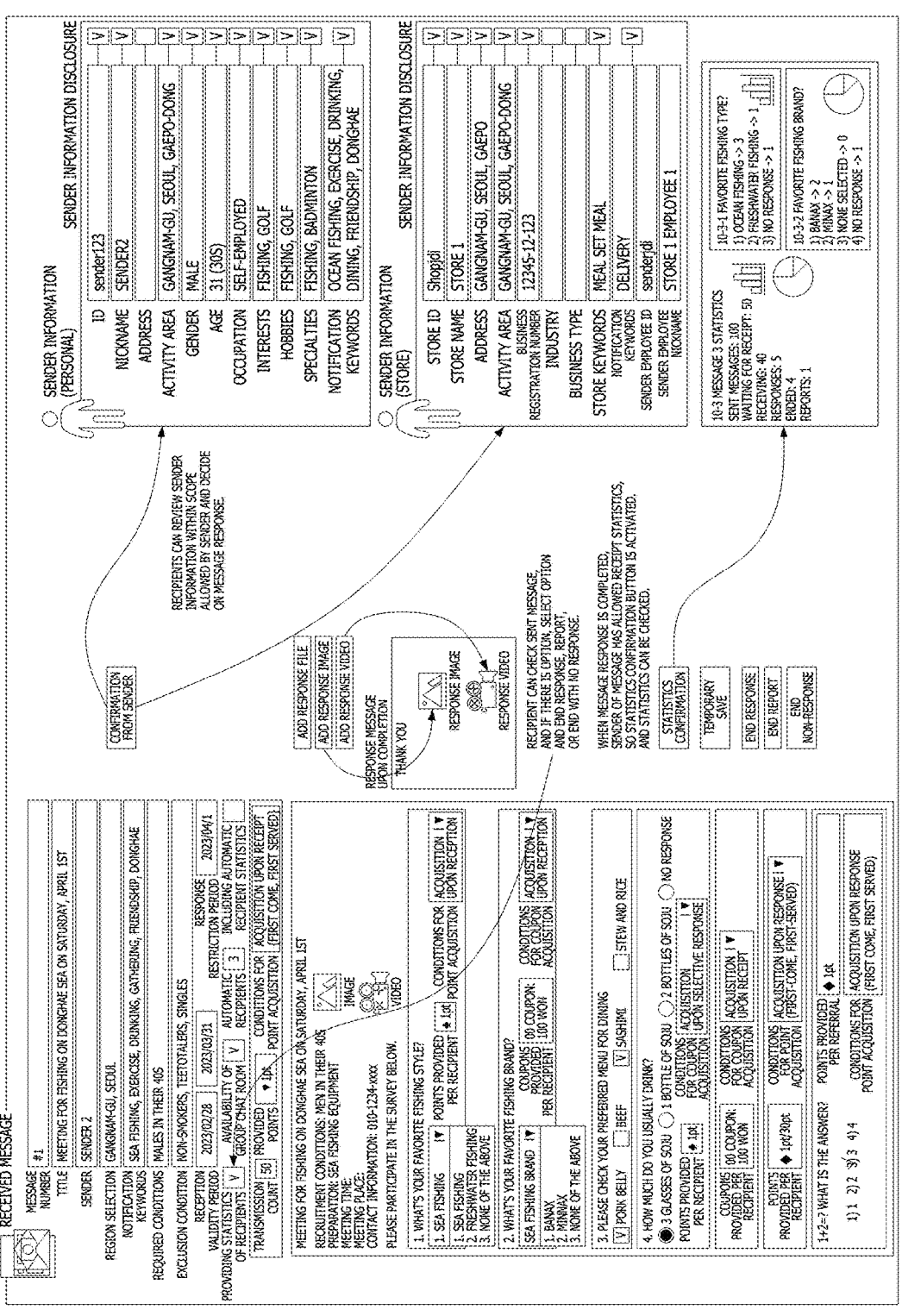
Figure 3M:
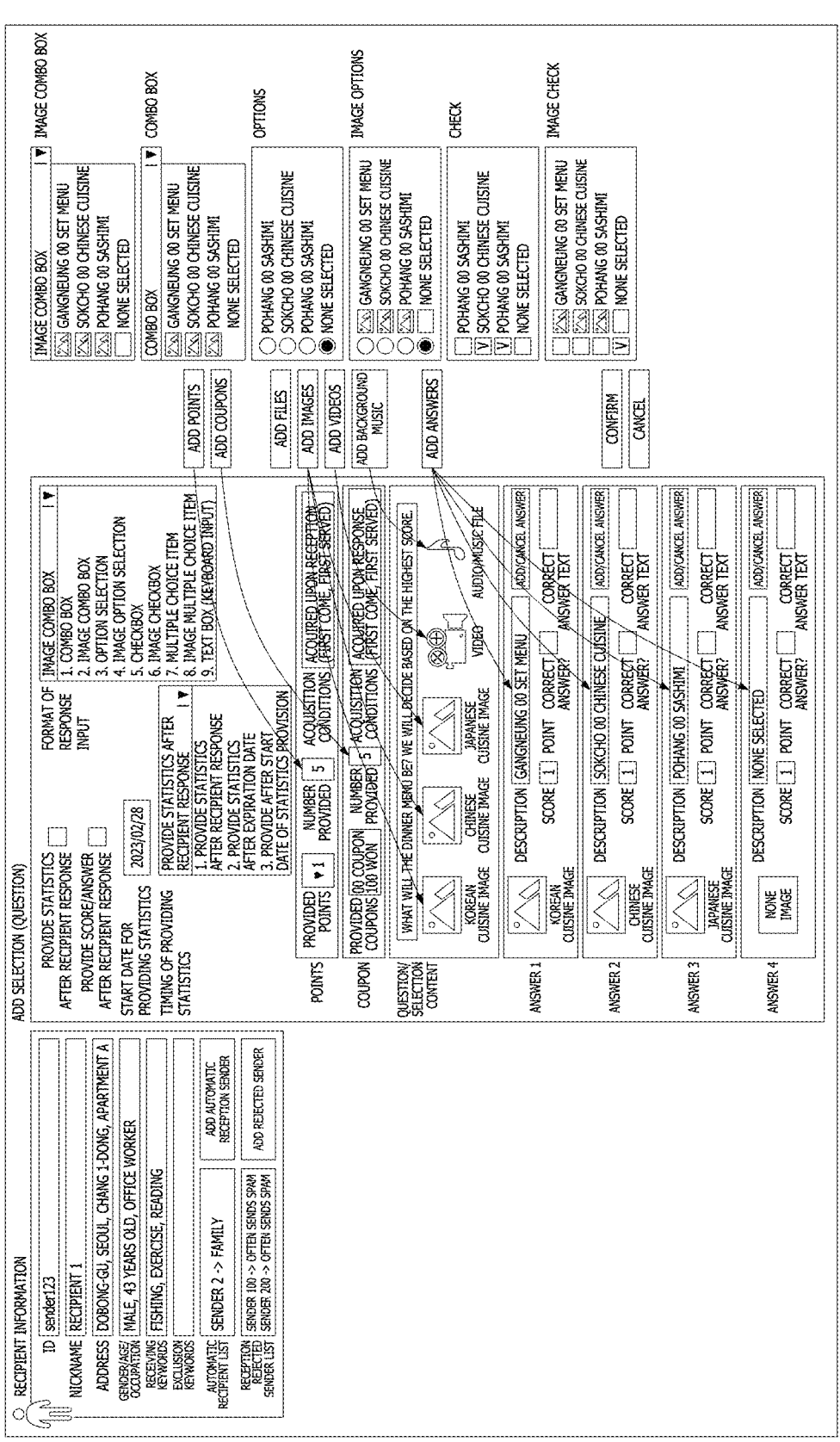
Figure 3N:
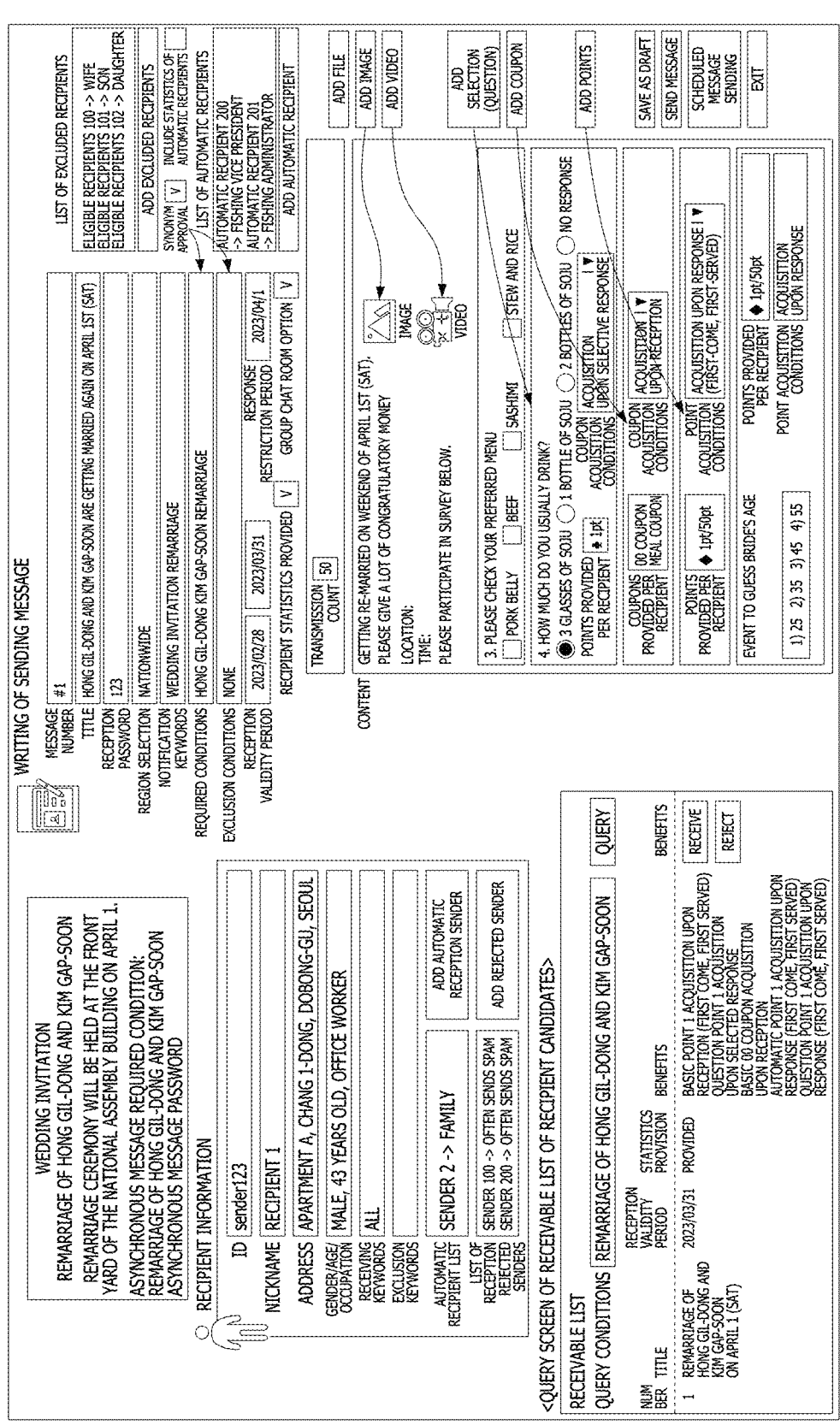

The flow according to the embodiment of the present invention may be summarized as shown in FIG. 3D, and may be implemented as shown in FIG. 3E. Additionally, the platform according to the present invention may be implemented through an application programming interface (API) as shown in FIG. 3F. Referring to FIG. 3G, a message standby station from the perspective of the transmitting terminal 100 is illustrated, and referring to FIG. 3H, a message standby station from the perspective of the receiving terminal 400 is illustrated. Depending on setting of the receiving target, the type of message content capable of being received may be determined. The relationship between FIG. 3G and FIG. 3H may be illustrated as FIG. 3I. As shown in FIG. 3J, the transmitting terminal 100 and the receiving terminal 400 may set user information, and a format may be provided such that message content is written in a form shown in FIG. 3K, but the present invention is not limited thereto. As shown in FIG. 3L, the receiving terminal 400 may receive message content, and confirm information about the transmitting terminal 100. As shown in FIG. 3M, when a survey requesting a response is included in message content, a response thereto may be entered. Referring to FIG. 3N, it can be seen that the message content is similar to the fishing recruitment message content described above but has a point acquisition time set in the viewable list. The point acquisition time may be set by the transmitting terminal 100, and the recipient of the receiving terminal 400 may view the point acquisition time and determine whether to receive the message content when the message content is found to benefit the recipient. Accordingly, the transmitter may identify how many people have viewed the wedding invitation and what foods the guests prefer, allowing for rapid and accurate determination when preparing the wedding.

Figure 4A:
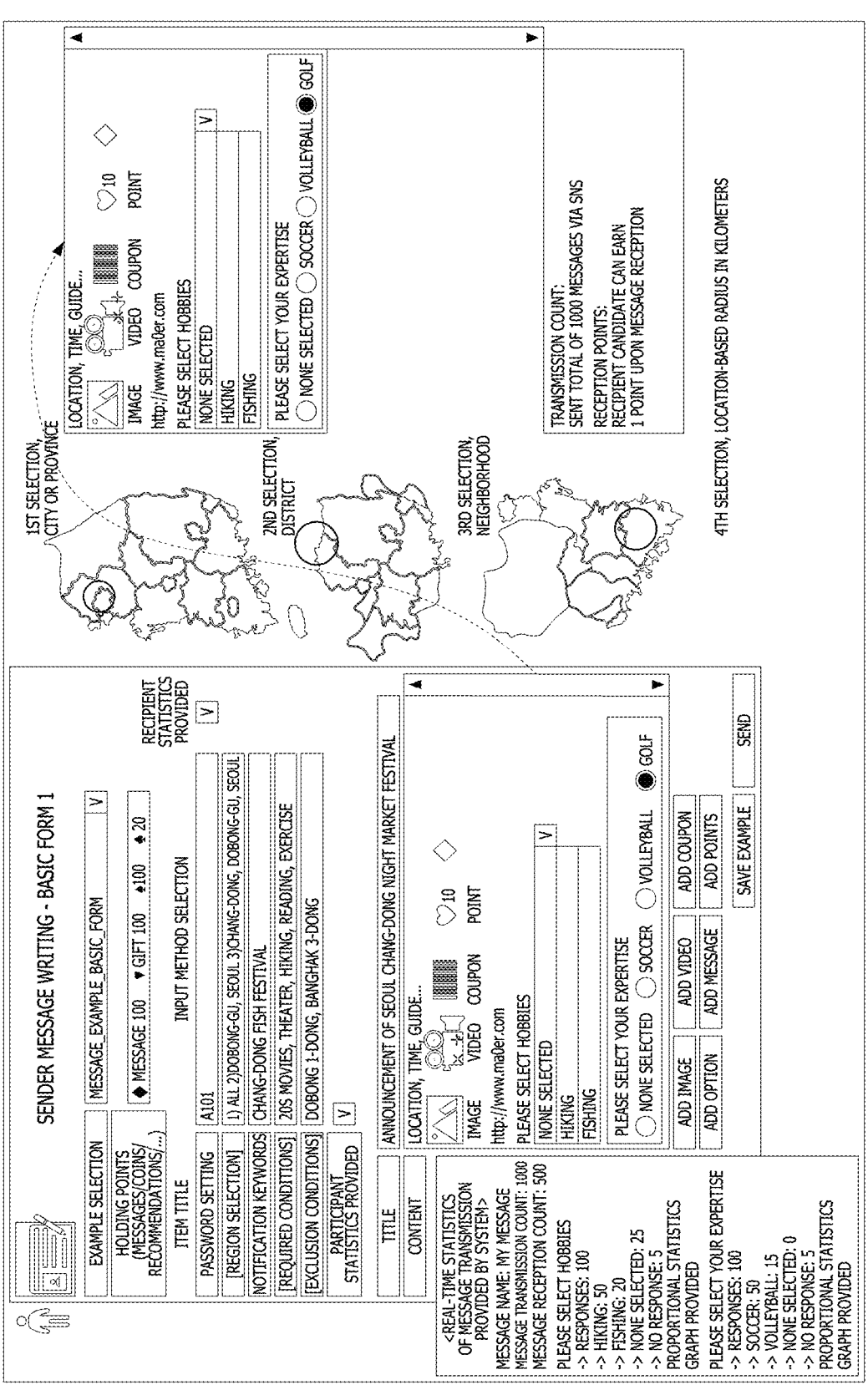
Figure 4B:
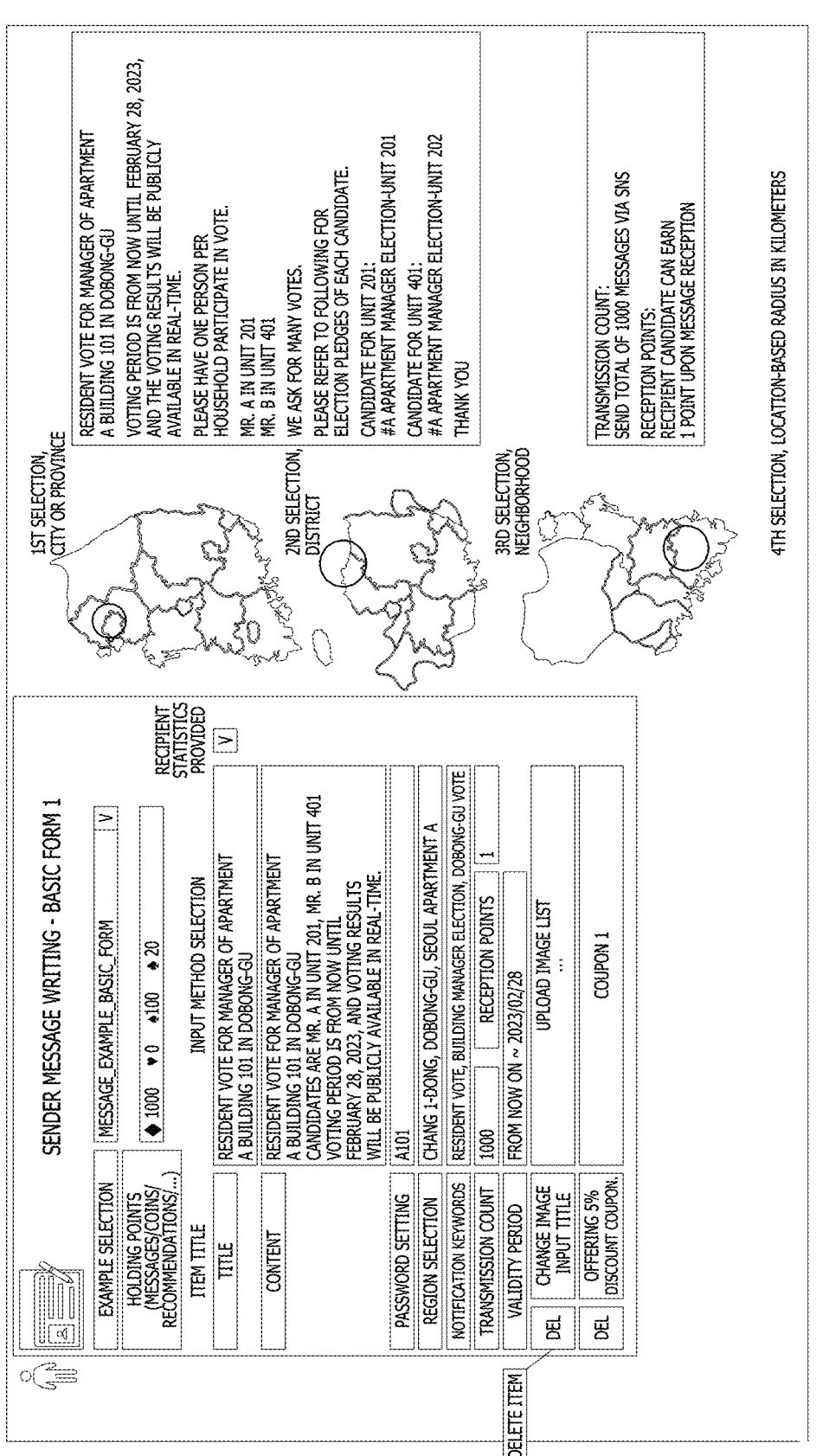
Figure 4C:
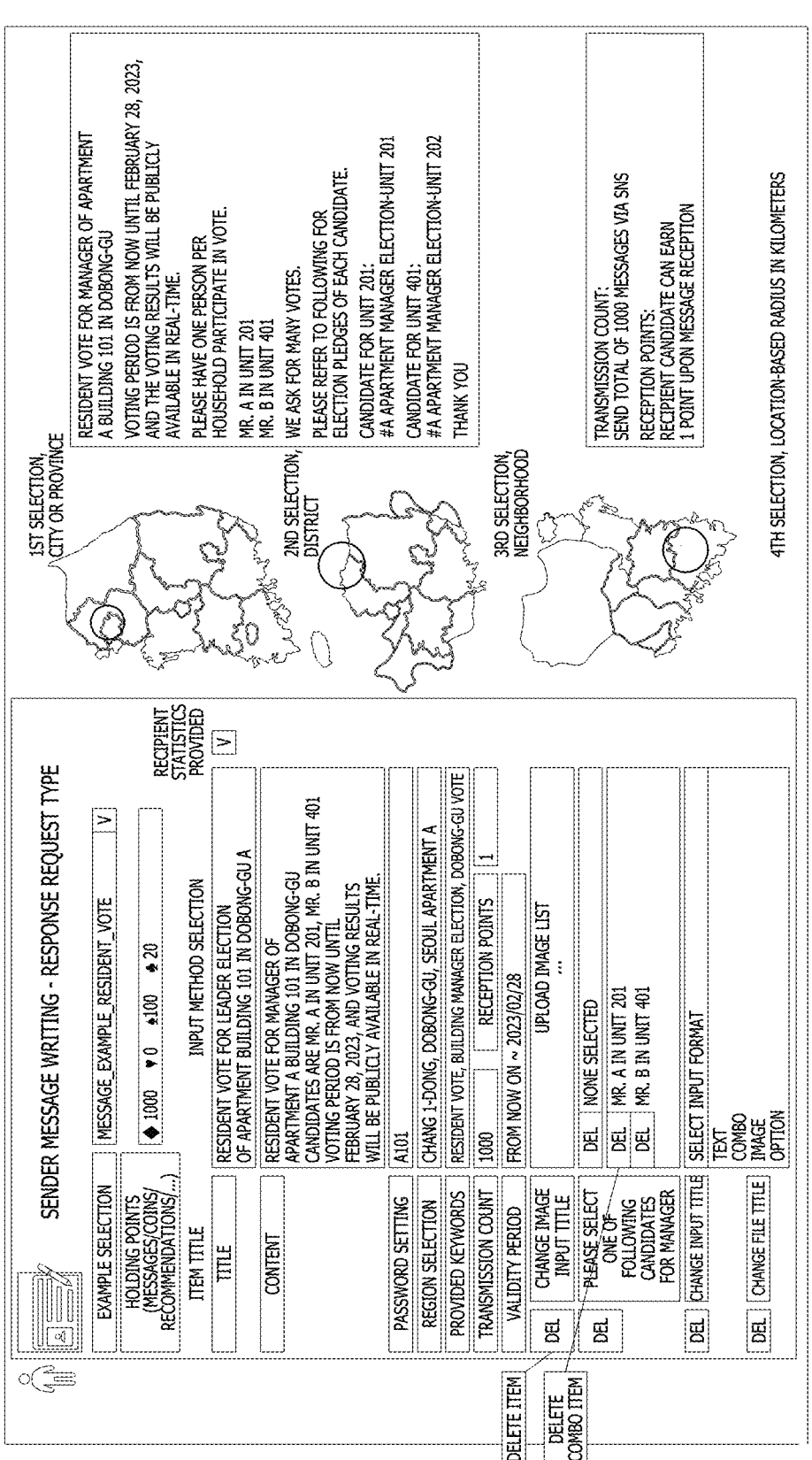
Figure 4D:
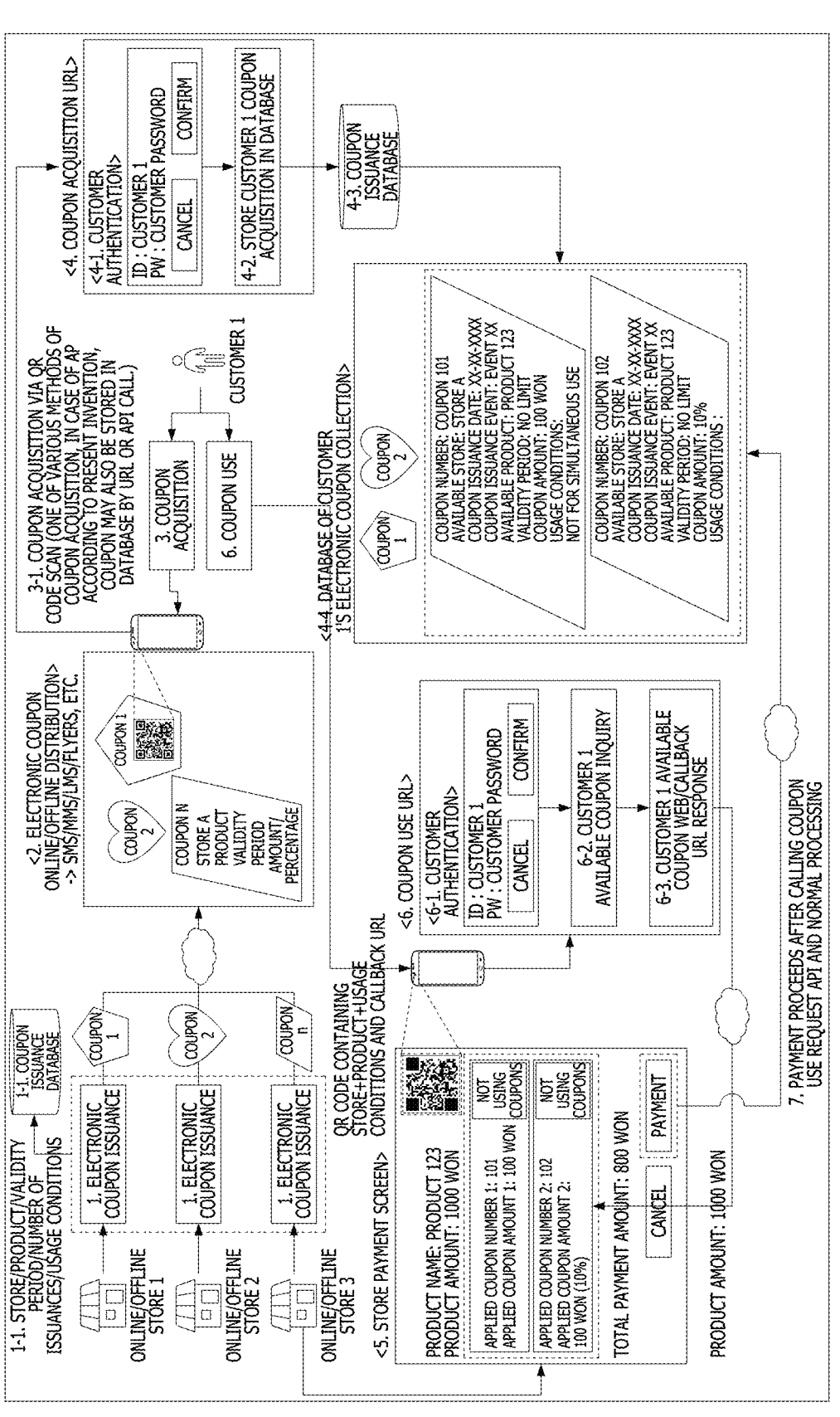
Figure 4E:
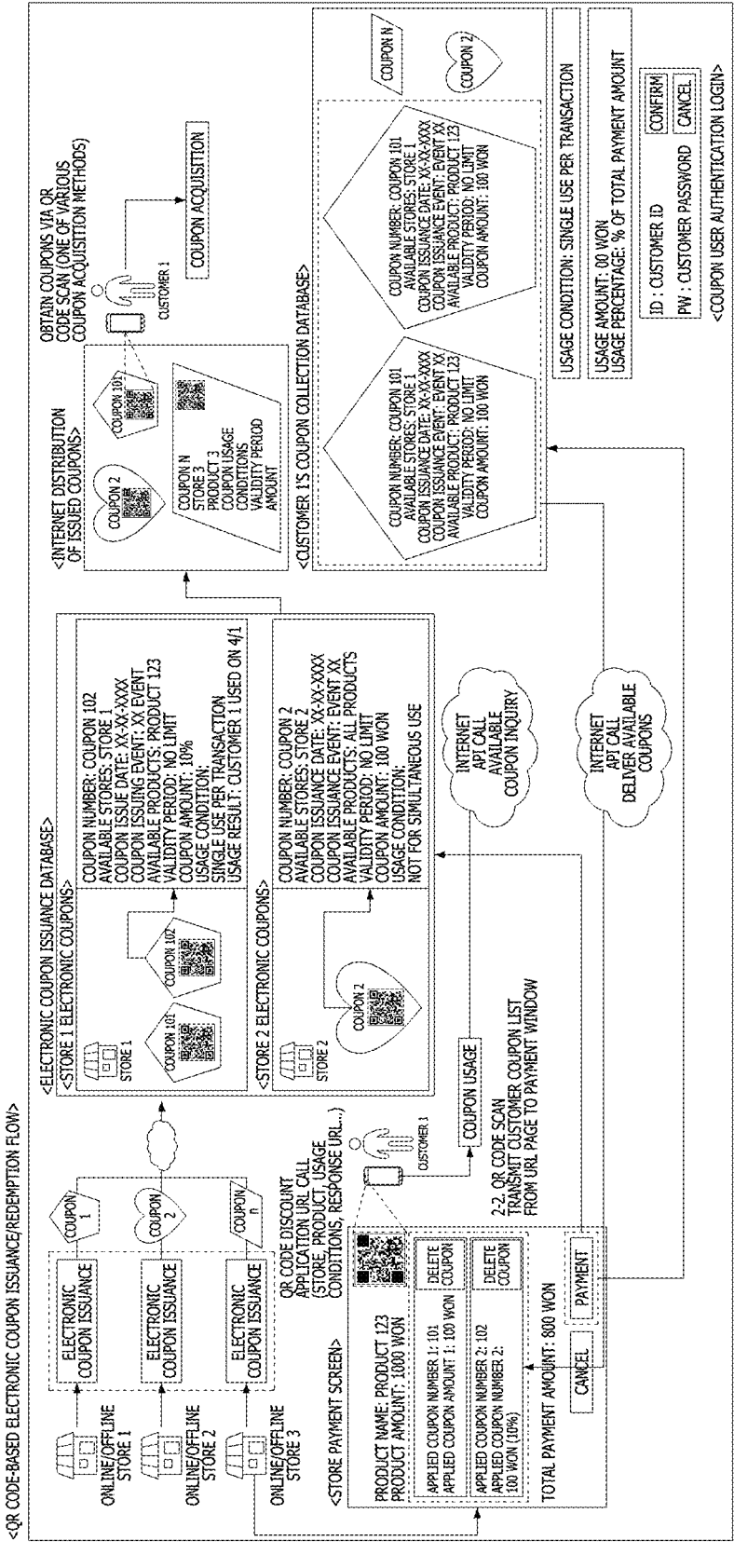
Figure 4F:
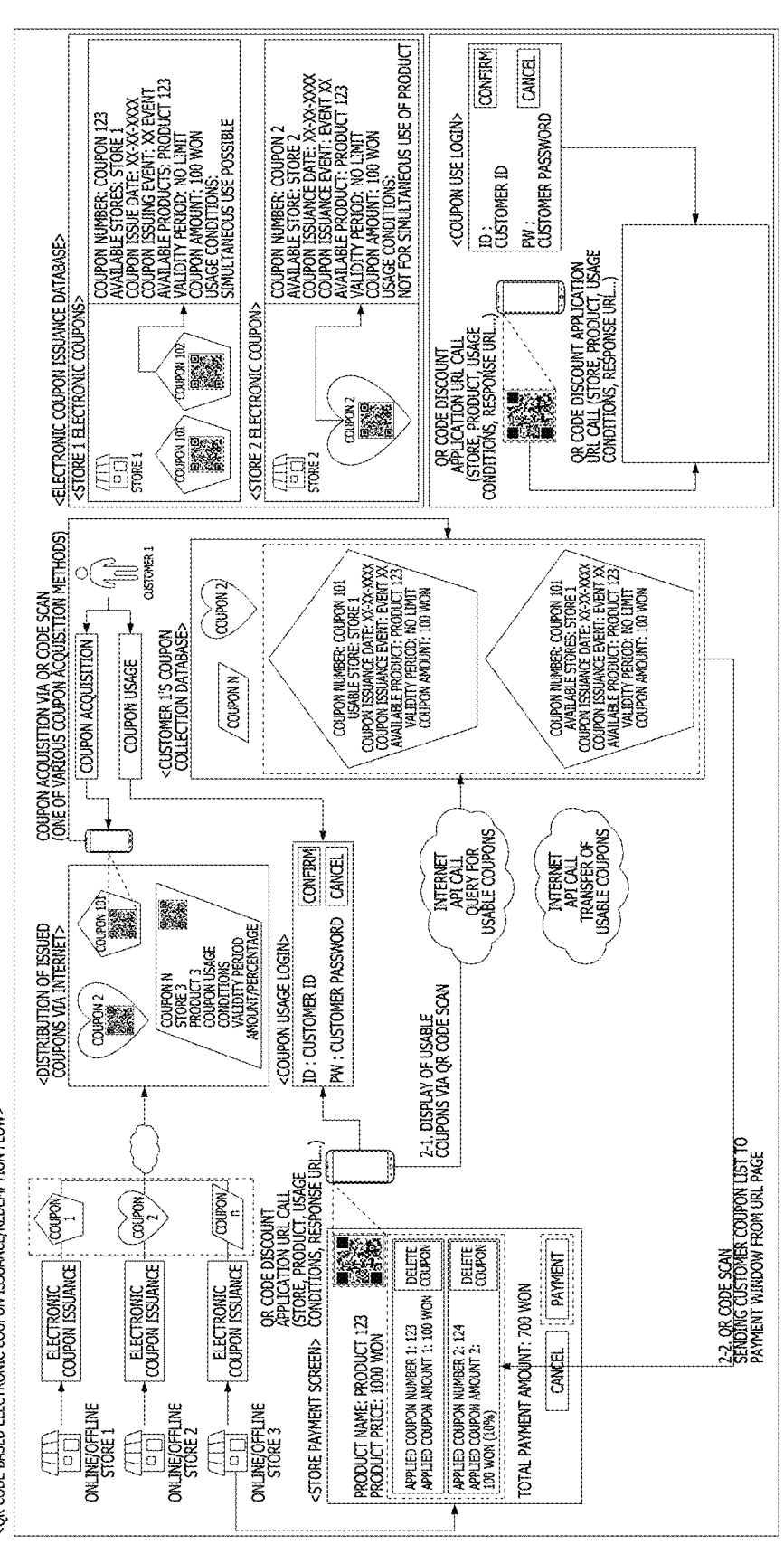

FIG. 4A is also similar to the fishing gathering message content and the wedding invitation described above, but illustrates an event notice announcing a local festival, and thus is different with regard to setting a reception target as [region]. FIG. 4B is a screen that informs about a public vote while providing coupons, and FIG. 4C illustrates a vote counting function. Responses may be collected and who has received more votes may be identified. In this case, the scope may be set based on not only the administrative district but also apartment A building 101. This is because the residents of apartment A building 101 do not stay only in building 101. FIGS. 4D to 4F illustrate details and a flow of a method of issuing and using an electronic coupon and the like when the transmitter of the transmitting terminal 100 is an individual, an individual business, or a corporate business. The key is to set conditions, such as acquisition conditions, usage conditions, validity periods, and the like, of coupons, and when the user desires to use the coupons, allow satisfaction of the conditions to be confirmed on the platform, allowing payment using the coupons. However, the method may be implemented differently depending on the embodiment, and thus it is not limited to the processes and flows shown in FIGS. 4D to 4F.

Content of the method of providing the message transmission and reception service using the message standby station omitted from the description referring to FIGS. 2 to 4 may be the same as the method of providing the message transmission and reception service using the message standby station described with reference to FIG. 1, or may be easily inferred from the content described above, and thus details thereof will be omitted.

Figure 5:
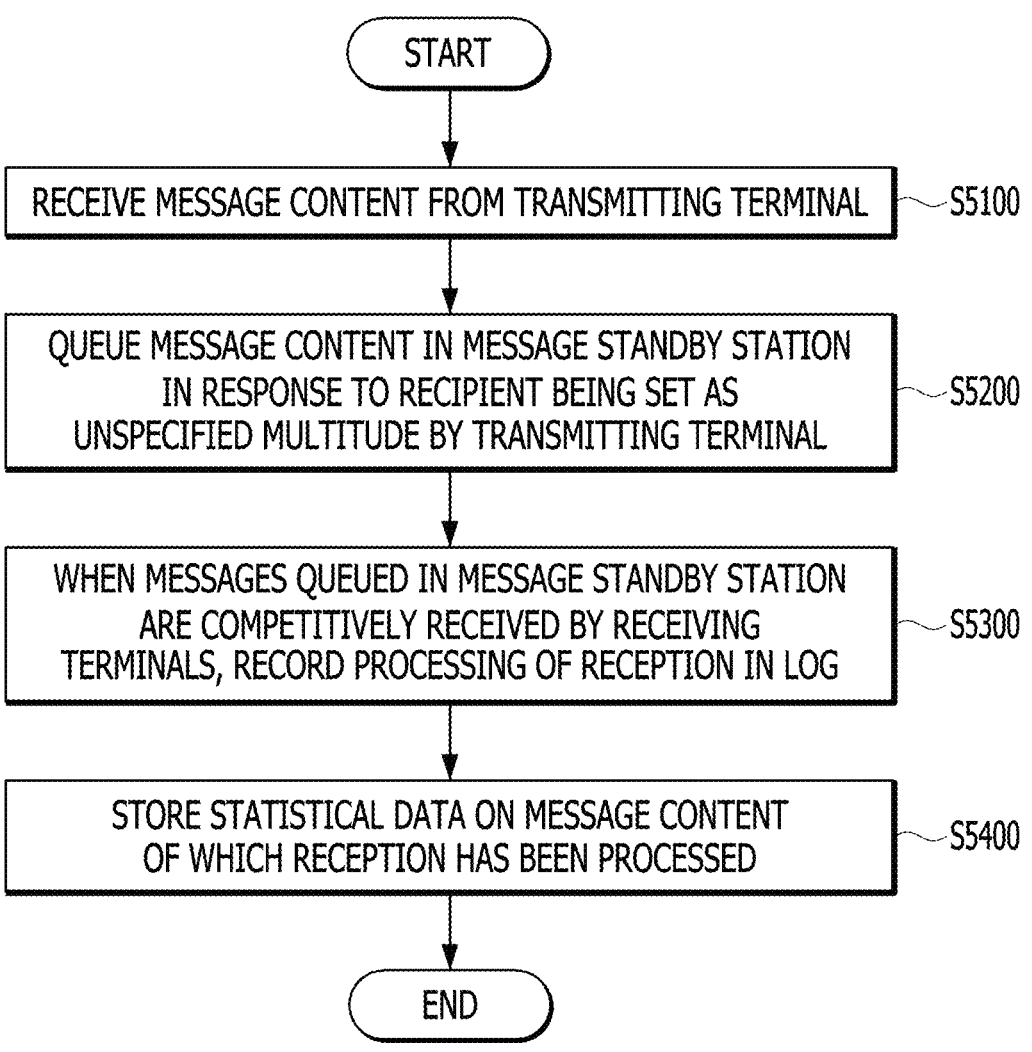
FIG. 5 is a flowchart for describing a method of providing a message transmission and reception service using a message standby station according to an embodiment of the present invention.

FIG. 5 is a flowchart showing a process of transmitting and receiving data between the components included in the system for providing a message transmission and reception service using a message standby station shown in FIG. 1 according to an embodiment of the present invention. Hereinafter, an example of a process of transmitting and receiving data between the components will be described with reference to FIG. 5, but the present application is not limited to the embodiment, and it is obvious to those skilled in the art that the process of transmitting and receiving data shown in FIG. 5 may be changed according to the various embodiments described above.

Referring to FIG. 5, the transmission and reception service providing server receives message content from the transmitting terminal (S5100).

In addition, the transmission and reception service providing server queues the message content in the message standby station in response to a recipient being set as an unspecified multitude by the transmitting terminal (S5200), and when the messages queued in the message standby station are competitively received by the receiving terminals, records processing of the reception in a log (S5300). In addition, the transmission and reception service providing server stores statistical data on the message content of which the reception has been processed (S5400).

The order of the above-described operations (S5100 to S5400) is only an example and is not limiting. That is, the order between the above-described operations (S5100 to S5400) may change, and some of the operations may be executed concurrently or deleted.

Content of the method of providing the message transmission and reception service using the message standby station omitted from the description referring to FIG. 5 may be the same as the method of providing the message transmission and reception service using the message standby station described with reference to FIGS. 1 to 4, or may be easily inferred from the content described above, and thus details thereof will be omitted.

The method of providing the message transmission and reception service using the message standby station according to an embodiment described in FIG. 5 may be implemented in the form of a recording medium including instructions executable by a computer, such as an application or program module executable by a computer. Computer-readable media may be any available media that may be accessed by a computer and include both volatile and non-volatile media, and removable and non-removable media. Additionally, computer-readable media may include all types of computer storage media. Computer storage media include both volatile and non-volatile, and removable and non-removable media implemented in any method or technology for storage of information such as computer readable instructions, data structures, program modules or other data.

The method of providing the message transmission and reception service using the message standby station according to an embodiment of the present invention described above may be executable by an application installed by default on a terminal (which may include programs included in a platform or operating system installed by default on the terminal, etc.) and may also be executed by an application (i.e. a program) installed directly on a master terminal by a user through an application-providing server such as an application store server or a web server associated with an application or service. In this sense, the method of providing the message transmission and reception service using the message standby station according to an embodiment of the present invention described above may be implemented as an application (i.e., a program) installed by default on the terminal or directly installed by the user, and may be recorded on a readable recording medium to be readable by a computer of a terminal, etc.

As is apparent from the above, one embodiment of the present invention is implemented to, when a transmitting terminal writes message content and requests that the message content be transmitted to an unspecified multitude, queue the message content in a message standby station, and then allow the messages in the message standby station to be competitively received by receiving terminals such that the message content can be voluntarily received rather than being passively received, and is implemented to induce motivation and action to receive and confirm the message content such that not only the reach rate but also the awareness rate of the message content can be increased.

It will be apparent to those skilled in the art to which the present invention belongs that the present invention may be embodied in other specific forms without changing the technical sprit or essential features thereof. It should therefore be apparent that the above-described embodiments are illustrative in all aspects and not restrictive. For example, each component described in a singular form may be implemented in a distributed manner, and similarly, components described as being distributed may also be implemented in a combined form.

The scope of the present invention is defined by the appended claims rather than by the foregoing description, and all changes or modifications derived from the meaning and scope of the claims and the equivalents thereof should be interpreted as being included in the scope of the present invention.

What is claimed is:

1. A message transmission and reception service using a message standby station, the system comprising:
a transmitting terminal configured to:

transmit message content to a transmission and reception service providing server for message transmission to an unspecified plurality of entities,
set a first transmitter condition that limits receiving the message content to a first number of receiving terminals, and
set a validity period within which the message content must be received by any receiving terminal;
the transmission and reception service providing server comprising:
a receiving unit configured to receive the message content transmitted by the transmitting terminal,
a standby station management unit configured to, in response to a recipient being set as the unspecified plurality of entities by the transmitting terminal, queue the message content in a message standby station,
a processing unit configured to, in response to the message content queued in the message standby station being competitively received by the receiving terminal through competition of one or more receiving terminals, record processing of the reception in a log,
a statistics management unit configured to store statistical data on the message content of which the reception has been processed, and
a viewing restriction unit configured to, in response to the message content being queued in the message standby station and the message content not satisfying one or more restriction conditions being set by a receiving terminal, preventing a transmission of the message content to the receiving terminal;
the receiving terminal configured to, to view the message content, competitively receive a message queued in the message standby station, wherein the receiving terminal competes with another receiving terminal to receive the message instead of passively waiting to receive the message, and wherein competitively receiving the message content comprises the receiving terminal matching a threshold number of conditions, the receiving terminal receiving the message content on a first-come-first-serve basis as one of the first predetermined number of receiving terminals, and the receiving terminal receiving the message content within the validity period of the transmitting terminal;
wherein the transmitting terminal is further configured to:
set demographic data as a receiving target when delivering messages to the unspecified plurality of entities such that the messages are providable to the unspecified plurality of entities without specifying a recipient, and without identifying phone numbers or messenger accounts of the unspecified plurality of entities,
wherein the receiving terminal is further configured to:
subsequent to receiving the message queued in the message standby station and based on content of the message queued in the message standby station violating one or more restrictions of the receiving terminal, restrict viewing of the receiving message, and
wherein the transmission and reception service providing server is further configured to:
allow the message content to be competitively received by the receiving terminal when the message content satisfies one or more restriction conditions set by the receiving terminal.

2. The system of claim 1, wherein the transmission and reception service providing server further comprises:

a reception restriction unit configured to, in response to a reception target being set by the transmitting terminal, restrict receiving of messages such that a corresponding receiving terminal that matches at least one condition associated with the receiving target receives the message content.

3. The system of claim 2, wherein the transmission and reception service providing server further comprises:

a list management unit configured to, in response to the reception target being set by the receiving terminal, identify whether a respective recipient corresponds to the receiving target, and determine whether to add the respective recipient to a viewable recipient list of the receiving terminal.

4. The system of claim 1, wherein the receiving terminal is configured to receive the message content corresponding to a viewing target and then transmit a response related to one of a report, a reply, and termination of the message content.

5. The system of claim 1, wherein the transmitting terminal is configured to set a reward and a provision time of the reward for a receiving terminal having received the message content and transmit the reward and the provision time of the reward.

6. The system of claim 1, wherein the transmission and reception service providing server further comprises:

a response collection unit configured to, when at least one question is included in the message content by the transmitting terminal, collect responses received from the receiving terminal, generate the statistical data, and provide the statistical data to the transmitting terminal or the receiving terminal.

7. The system of claim 1, wherein the transmission and reception service providing server further comprises:

a reward usage unit configured to, in response to a reward being received by the receiving terminal having received the message content or responded to the message content, set the reward to be used for at least one product or service in a pre-established shopping mall.

8. The system of claim 1, wherein the transmission and reception service providing server further comprises:

a coupon issuing unit configured to, in response to a coupon being inserted into the message content and the message content being transmitted by the transmitting terminal, set the coupon to be used at a store of the transmitting terminal by the receiving terminal having received the message content.

9. The system of claim 1, wherein the transmission and reception service providing server further comprises:

a monitoring unit configured to monitor a current location and a status of the message content, and based on the status of the message content, generate the statistical data, wherein the statistical data comprises one or more of an opening status of the message content or a response status of the message content.

* * * * *